United States Patent
Tehranchi et al.

(10) Patent No.: US 10,360,565 B2
(45) Date of Patent: Jul. 23, 2019

(54) SYSTEM AND METHOD FOR PROVIDING A UNIVERSAL ENDPOINT ADDRESS SCHEMA TO ROUTE DOCUMENTS AND MANAGE DOCUMENT WORKFLOWS

(71) Applicant: Kofax, Inc., Irvine, CA (US)

(72) Inventors: Mehdi Tehranchi, Potomac, MD (US); Henric Harutunian, Clarksville, MD (US); Kaveh Parsee, Rockville, MD (US)

(73) Assignee: KOFAX, INC., Irvine, CA (US)

( * ) Notice: Subject to any disclaimer, the term of this patent is extended or adjusted under 35 U.S.C. 154(b) by 0 days.

(21) Appl. No.: 13/843,652

(22) Filed: Mar. 15, 2013

(65) Prior Publication Data

US 2013/0311420 A1     Nov. 21, 2013

Related U.S. Application Data

(60) Provisional application No. 61/648,957, filed on May 18, 2012, provisional application No. 61/648,949, filed on May 18, 2012.

(51) Int. Cl.
    *G06F 17/30*  (2006.01)
    *G06Q 30/00*  (2012.01)
    (Continued)

(52) U.S. Cl.
    CPC ........... *G06Q 30/018* (2013.01); *G06F 16/93* (2019.01); *G06Q 10/103* (2013.01)

(58) Field of Classification Search
    CPC .. G06F 17/30011; G06F 21/10; G06Q 10/103
    (Continued)

(56) References Cited

U.S. PATENT DOCUMENTS 5,446,740 A *   8/1995   Yien ........................ H04L 29/06
                                                                370/426
6,314,517 B1 * 11/2001   Moses et al. ................. 713/156
                         (Continued)

FOREIGN PATENT DOCUMENTS

EP        0756400 A2    1/1997
EP        1551133 B1    11/2008
                        (Continued)

OTHER PUBLICATIONS

Non-Final Office Action for U.S. Appl. No. 13/843,586, dated Mar. 18, 2016.
(Continued)

*Primary Examiner* — Sheree N Brown
(74) *Attorney, Agent, or Firm* — Zilka-Kotab, P.C.

(57) ABSTRACT

One example of the system and method described herein may provide a universal endpoint address schema to route documents and manage document workflows, which may include one or more encapsulated workflow packages. In particular, a globally unique endpoint address may be specified using the universal endpoint address schema to route documents to any addressable destination and link the documents to workflow steps, processing rules, and business intelligence that can enforce business constraints. Furthermore, the globally unique endpoint address may be specified using the universal endpoint address schema may be linked to tickets that request documents or document-related services from third-parties in cloud or virtualized data centers, whereby the universal endpoint address schema may extend the abilities that different organizations have to collaborate with one another.

14 Claims, 18 Drawing Sheets

(51) Int. Cl.
  *G06F 16/93* (2019.01)
  *G06Q 10/10* (2012.01)

(58) Field of Classification Search
  USPC .............................. 707/608; 726/26, 27, 30
  See application file for complete search history.

(56) References Cited

U.S. PATENT DOCUMENTS

| | | | |
|---|---|---|---|
| 6,327,611 B1* | 12/2001 | Everingham | 709/206 |
| 6,452,691 B1* | 9/2002 | Marshall | 358/1.15 |
| 6,502,000 B1 | 12/2002 | Arnold | |
| 6,523,027 B1* | 2/2003 | Underwood | G06F 9/465 |
| 6,584,466 B1* | 6/2003 | Serbinis et al. | 715/209 |
| 6,601,233 B1* | 7/2003 | Underwood | G06F 8/24 |
| | | | 717/100 |
| 6,609,128 B1* | 8/2003 | Underwood | G06F 9/454 |
| | | | 707/610 |
| 6,625,642 B1* | 9/2003 | Naylor et al. | 709/206 |
| 6,650,894 B1 | 11/2003 | Berstis | |
| 6,671,805 B1* | 12/2003 | Brown et al. | 713/176 |
| 6,674,924 B2* | 1/2004 | Wright | G06F 17/30011 |
| | | | 382/306 |
| 6,944,648 B2* | 9/2005 | Cochran et al. | 709/206 |
| 6,959,382 B1* | 10/2005 | Kinnis et al. | 713/170 |
| 6,970,850 B1 | 11/2005 | Freeny | |
| 7,100,195 B1* | 8/2006 | Underwood | G06F 9/451 |
| | | | 726/2 |
| 7,143,129 B2 | 11/2006 | Barillaud | |
| 7,213,046 B2 | 5/2007 | Barillaud | |
| 7,251,728 B2* | 7/2007 | Toh | G06F 21/64 |
| | | | 380/30 |
| 7,356,615 B2 | 4/2008 | Cai | |
| 7,360,079 B2* | 4/2008 | Wall | 713/155 |
| 7,412,374 B1 | 8/2008 | Seiler et al. | |
| 7,506,048 B1 | 3/2009 | Motoyama | |
| 7,631,265 B1 | 12/2009 | Quinn | |
| 7,698,230 B1* | 4/2010 | Brown | G06F 21/64 |
| | | | 380/30 |
| 7,707,312 B2 | 4/2010 | Rose et al. | |
| 7,707,642 B1* | 4/2010 | Herbach | G06F 21/6227 |
| | | | 726/27 |
| 7,826,831 B2 | 11/2010 | Bettis | |
| 8,056,012 B2* | 11/2011 | Chen | G06F 8/34 |
| | | | 715/750 |
| 8,233,943 B1 | 7/2012 | Othmer | |
| 8,271,703 B2 | 9/2012 | Wang et al. | |
| 8,311,983 B2 | 11/2012 | Guzik | |
| 8,330,984 B2 | 12/2012 | Scaff | |
| 8,339,624 B2 | 12/2012 | Sakakibara | |
| 8,413,256 B2 | 4/2013 | Gonzalez | |
| 8,478,669 B1 | 7/2013 | Coates et al. | |
| 8,479,102 B2 | 7/2013 | Son | |
| 8,553,623 B2 | 10/2013 | Buer | |
| 8,610,835 B2* | 12/2013 | Shintani | H04N 5/57 |
| | | | 348/552 |
| 8,626,178 B2 | 1/2014 | Johansen | |
| 8,632,000 B2 | 1/2014 | Laracey | |
| 8,792,058 B2 | 7/2014 | Hardacker et al. | |
| 8,793,058 B2 | 7/2014 | Hardacker | |
| 8,805,787 B2 | 8/2014 | Hao | |
| 8,937,534 B2 | 1/2015 | Kreiner | |
| 8,970,647 B2 | 3/2015 | Alsina | |
| 8,977,408 B1 | 3/2015 | Cazanas | |
| 9,003,512 B2 | 4/2015 | Gonzalez | |
| 9,007,623 B2* | 4/2015 | St. Jacques, Jr. | G06F 3/1204 |
| | | | 358/1.15 |
| 9,137,034 B2 | 9/2015 | Humpleman | |
| 9,141,724 B2 | 9/2015 | Cremin | |
| 9,158,449 B2 | 10/2015 | Matsubara | |
| 9,160,814 B2 | 10/2015 | Dunton | |
| 9,197,772 B2 | 11/2015 | McKinney et al. | |
| 9,348,508 B2 | 5/2016 | Baughman | |
| 9,369,445 B2 | 6/2016 | Mahajan | |
| 9,760,848 B2* | 9/2017 | Farmer | G06Q 10/0633 |
| 9,852,127 B2* | 12/2017 | Dettinger | G06F 17/2785 |
| 2002/0001302 A1 | 1/2002 | Pickett | |
| 2002/0111984 A1* | 8/2002 | Getler | G06F 9/5038 |
| | | | 718/105 |
| 2002/0161745 A1 | 10/2002 | Call | |
| 2003/0005100 A1 | 1/2003 | Barnard et al. | |
| 2003/0079006 A1 | 4/2003 | White et al. | |
| 2004/0156071 A1 | 8/2004 | Lay et al. | |
| 2004/0172586 A1 | 9/2004 | Ragnet et al. | |
| 2004/0246505 A1 | 12/2004 | Oh | |
| 2005/0187852 A1* | 8/2005 | Hwang | G06Q 40/02 |
| | | | 705/36 R |
| 2005/0197860 A1 | 9/2005 | Joffe et al. | |
| 2005/0203805 A1 | 9/2005 | Clough et al. | |
| 2005/0221853 A1 | 10/2005 | Silvester | |
| 2005/0254453 A1 | 11/2005 | Barneah | |
| 2005/0257248 A1 | 11/2005 | Kegel et al. | |
| 2006/0010133 A1 | 1/2006 | Bozek et al. | |
| 2006/0173671 A1 | 8/2006 | Okawa | |
| 2006/0218490 A1* | 9/2006 | Fink | G06F 17/211 |
| | | | 715/234 |
| 2006/0242322 A1 | 10/2006 | Williams et al. | |
| 2006/0256392 A1* | 11/2006 | Van Hoof | H04N 1/00209 |
| | | | 358/402 |
| 2007/0002355 A1 | 1/2007 | Kai | |
| 2007/0016861 A1 | 1/2007 | Salomaa et al. | |
| 2007/0017971 A1 | 1/2007 | Im | |
| 2007/0130588 A1 | 6/2007 | Edwards et al. | |
| 2007/0150329 A1* | 6/2007 | Brook | G06Q 10/06 |
| | | | 705/7.13 |
| 2007/0174791 A1* | 7/2007 | Park | G06F 16/435 |
| | | | 715/838 |
| 2007/0211768 A1 | 9/2007 | Cornwall et al. | |
| 2007/0271522 A1 | 11/2007 | Son | |
| 2007/0299681 A1 | 12/2007 | Plastina | |
| 2008/0005312 A1 | 1/2008 | Boss et al. | |
| 2008/0086688 A1* | 4/2008 | Chandratillake | G06F 16/78 |
| | | | 715/719 |
| 2008/0126557 A1 | 5/2008 | Motoyama et al. | |
| 2008/0127183 A1* | 5/2008 | Emerson | G06F 9/5038 |
| | | | 718/100 |
| 2008/0151767 A1* | 6/2008 | Moran | H04L 41/0253 |
| | | | 370/252 |
| 2008/0223926 A1 | 9/2008 | Miller | |
| 2008/0228908 A1 | 9/2008 | Link et al. | |
| 2009/0141174 A1 | 6/2009 | Hardacker | |
| 2009/0164495 A1 | 6/2009 | MacLeod et al. | |
| 2009/0254572 A1* | 10/2009 | Redlich | G06Q 10/06 |
| 2009/0285120 A1 | 11/2009 | Swan | |
| 2009/0303519 A1 | 12/2009 | Shimatani et al. | |
| 2010/0100832 A1 | 4/2010 | Wang et al. | |
| 2010/0121921 A1 | 5/2010 | Dunton | |
| 2010/0153998 A1* | 6/2010 | Paik | H04H 20/24 |
| | | | 725/39 |
| 2010/0154000 A1* | 6/2010 | Macrae | H04N 5/44543 |
| | | | 725/41 |
| 2010/0161783 A1 | 6/2010 | Komine | |
| 2010/0225958 A1 | 9/2010 | Selvaraj et al. | |
| 2010/0225959 A1 | 9/2010 | Selvaraj et al. | |
| 2010/0250497 A1* | 9/2010 | Redlich | F41H 13/00 |
| | | | 707/661 |
| 2010/0274863 A1* | 10/2010 | Foygel et al. | 709/206 |
| 2010/0280956 A1 | 11/2010 | Chutorash et al. | |
| 2010/0299763 A1 | 11/2010 | Marcus et al. | |
| 2011/0051018 A1* | 3/2011 | Shintani | H04N 5/4403 |
| | | | 348/734 |
| 2011/0055382 A1 | 3/2011 | Narasimhan | |
| 2011/0077802 A1 | 3/2011 | Halloran et al. | |
| 2011/0145863 A1 | 6/2011 | Alsina | |
| 2011/0162010 A1* | 6/2011 | Ellis | H04N 7/163 |
| | | | 725/40 |
| 2011/0205576 A1* | 8/2011 | Halron | G06F 17/30011 |
| | | | 358/1.15 |
| 2011/0258250 A1 | 10/2011 | Cremin | |
| 2012/0036441 A1 | 2/2012 | Basir | |
| 2012/0117497 A1 | 5/2012 | Uola et al. | |
| 2012/0146918 A1 | 6/2012 | Kreiner | |
| 2012/0191831 A1 | 7/2012 | Kanzabedian et al. | |

(56) References Cited

U.S. PATENT DOCUMENTS

| | | |
|---|---|---|
| 2012/0243029 A1 | 9/2012 | St. Jacques, Jr. |
| 2012/0320406 A1* | 12/2012 | Giannetti ............... G06F 3/121 358/1.15 |
| 2013/0098983 A1 | 4/2013 | Neff et al. |
| 2013/0148033 A1 | 6/2013 | Shintani |
| 2013/0200606 A1* | 8/2013 | Omar ..................... B41M 3/14 283/74 |
| 2013/0311386 A1 | 11/2013 | Tehranchi et al. |
| 2014/0115492 A1 | 4/2014 | Tehranchi et al. |
| 2015/0062605 A1 | 3/2015 | McKinney et al. |
| 2015/0067144 A1 | 3/2015 | Scovill |

FOREIGN PATENT DOCUMENTS

| | | |
|---|---|---|
| EP | 1999557 A1 | 12/2008 |
| EP | 2003542 A1 | 12/2008 |
| EP | 2 083 351 A1 | 7/2009 |
| EP | 2 365 431 A2 | 9/2011 |
| EP | 2 466 457 A1 | 6/2012 |
| EP | 2365431 A3 | 11/2012 |
| EP | 2 860 625 A1 | 4/2015 |
| WO | WO 2007/105577 A1 | 9/2007 |
| WO | WO 2007/136622 A2 | 11/2007 |

OTHER PUBLICATIONS

Final Office Action for U.S. Appl. No. 13/843,586, dated Sep. 19, 2016.
Merriam-Webster; https://www.merriam-webster.com/dictionary/list; "List Definition of List by Merriam-Webster", pp. 1-5 downloaded Feb. 28, 2017.
Tehranchi et al., U.S. Appl. No. 13/843,586, filed Mar. 15, 2013.
Restriction Requirement from U.S. Appl. No. 13/843,586, dated Oct. 22, 2015.
Non-Final Office Action from U.S. Appl. No. 13/843,586, dated Sep. 29, 2017.
Final Office Action from U.S. Appl. No. 13/843,586, dated Apr. 19, 2018.
Advisory Action from U.S. Appl. No. 13/843,586, dated Jun. 29, 2018.
Non-Final Office Action from U.S. Appl. No. 13/843,586, dated Apr. 15, 2019.
Extended European Search Report from European Application No. EP14183338.4 dated Mar. 12, 2015.
Tehranchi et al., U.S. Appl. No. 13/843,502, filed Mar. 15, 2013.
Non-Final Office Action from U.S. Appl. No. 13/843,502, dated Jul. 16, 2015.
Final Office Action from U.S. Appl. No. 13/843,502, dated Jan. 26, 2016.
Advisory Action from U.S. Appl. No. 13/843,502, dated Apr. 11, 2016.
Non-Final Office Action from U.S. Appl. No. 13/843,502, dated Oct. 17, 2016.
Final Office Action from U.S. Appl. No. 13/843,502, dated Apr. 21, 2017.
Final Office Action from U.S. Appl. No. 13/843,502, dated May 11, 2017.
Advisory Action from U.S. Appl. No. 13/843,502, dated Oct. 11, 2017.
Non-Final Office Action from U.S. Appl. No. 13/843,502, dated Feb. 16, 2018.
Non-Final Office Action from U.S. Appl. No. 13/843,502, dated Jul. 6, 2018.
Final Office Action from U.S. Appl. No. 13/843,502, dated Oct. 31, 2018.
McKinney et al., U.S. Appl. No. 14/017,294, filed Sep. 3, 2013.
Non-Final Office Action from U.S. Appl. No. 14/017,294, dated Jul. 15, 2014.
Notice of Allowance from U.S. Appl. No. 14/017,294, dated Dec. 31, 2014.
Notice of Allowance from U.S. Appl. No. 14/017,294, dated May 28, 2015.
Notice of Allowance from U.S. Appl. No. 14/017,294, dated Sep. 21, 2015.

* cited by examiner

Document Handling Options

OCR/PDF, Store in DMS

Created By: DOM1/BJones
Requested By: DOM1/BJones
Expiration: No Expiration
Usage: Unlimited Uses

SMARTicket ID: 1073741937

Select routing destinations           Select document types

☒ Email to info@nsius.com                 ☒ Invoice
☐ Fax to ACME Corp.                       ☒ Contract
☒ PDF and Save to Folder                  ☐ Lease
☐ Stamp and Store in SharePoint           ☐ Insurance Claim

Figure 2

SYSTEM AND METHOD FOR PROVIDING A UNIVERSAL ENDPOINT ADDRESS SCHEMA TO ROUTE DOCUMENTS AND MANAGE DOCUMENT WORKFLOWS

CROSS-REFERENCE TO RELATED APPLICATIONS

This application claims priority to (1) U.S. Provisional Patent Application Ser. No. 61/648,949, filed May 18, 2012, and (2) U.S. Provisional Patent Application Ser. No. 61/648,957, filed May 18, 2012, each of which are incorporated by reference herein in their entirety. This application is also related to another U.S. patent application Ser. No. 13/843,586, having filed on an even date herewith, which is hereby incorporated by reference herein in its entirety.

FIELD OF THE INVENTION

The invention generally relates to a system and method for providing a universal endpoint address schema to route documents and manage document workflows, which may include one or more encapsulated workflow packages, and in particular, to a globally unique endpoint address that can be used to route documents to any addressable destination, link the documents to workflow steps, processing rules, and business intelligence that can enforce business constraints, and generate tickets to request documents or document-related services from third-parties in cloud or virtualized data centers to extend the abilities that different organizations have to collaborate with one another.

BACKGROUND OF THE INVENTION

Today, the methods most commonly used to communicate or otherwise route documents from one location to another tend to be limited to certain designated endpoints, which typically include e-mail inboxes and fax machines. However, these methods provide a narrow addressability base, in that documents can only be routed to e-mail addresses associated with target inboxes, fax numbers associated with receiving fax machines, and so on. Moreover, the information that conventional document routing systems typically use to address these limited routing endpoints often has little (if any) native connection to business rules, which can impose a substantial impact on efficiency, costs, and legal and regulatory compliance due to different constraints that may be associated with handling invoices, claims, order forms, or other business documents.

In other words, conventional document routing systems tend to give users the discretion to connect incoming documents with the appropriate business rules and process the incoming documents into appropriate business applications based on controls that define how the incoming documents should be handled. As such, businesses that employ conventional document routing systems may face governance, risk, and compliance vulnerabilities, among other risks, due to the difficulty or inability to ensure that users properly handle incoming documents based on relevant business rules.

Furthermore, many businesses tend to have relationships that require collaboration and interaction across organizational boundaries, which can raise concerns relating to security, access controls, and proper management relating to how documents, data, and other information that one business may share with another should be handled on the receiving end. For example, a particular business may have relationships with other organizations to outsource certain operations or otherwise engage in partnerships or interactions that involve processing business related documents. However, conventional document management systems tend to fall short in suitably providing an organization with the ability to control how important or sensitive information will be handled once documents or other materials move beyond organizational boundaries.

Moreover, with cloud and virtualized data centers having increasing prevalence in the modern business marketplace, the opaqueness associated with how third-party entities that provide cloud and virtualized data centers implement access controls or other management mechanisms associated with data hosted therein can compound these security concerns due to the inability to control governance, risk, and compliance issues in third-party data centers based on unique business requirements.

Accordingly, conventional systems that attempt to provide mechanisms to route and manage documents suffer from these and various additional problems.

SUMMARY OF THE INVENTION

According to one aspect of the invention, to solve these and various additional problems associated with conventional systems that attempt to provide mechanisms to route and manage documents, the system and method described herein may provide a universal endpoint address schema to route documents and manage document workflows, which may generally include one or more encapsulated workflow packages, and furthermore, the system and method described herein may provide various mechanisms to create and manage the encapsulated workflow packages that may be routed and managed via the document workflows.

More particularly, the universal endpoint addressing schema provided in the system and method described herein may provide a globally unique identifier that can be applied to any suitable document routing endpoint. For example, in one implementation, the universal endpoint addressing schema may specify various parameters or other criteria to assign numbers, names, or other information that can uniquely identify any suitable document routing endpoint. Furthermore, in one implementation, the universal endpoint addressing schema may address various governance, risk, compliance, and other security concerns via a link to one or more workflow steps, processing stages, or other business rules to enforce proper processing associated with documents, data, or other information routed therewith.

According to one aspect of the invention, the universal endpoint addressing schema provided in the system and method described herein may generally allow users to identify or otherwise point to any addressable routing destination and obtain a globally unique identifier that can be used to address the routing destination and thereby send documents, data, or other information to the routing destination, which may substantially expand the addressable endpoints available to receive routed documents (e.g., beyond simply e-mail inboxes and fax machines).

In one implementation, the workflow steps, processing stages, or other business rules that can be linked to the globally unique identifiers created with the universal endpoint addressing schema may specify various controls to enforce proper processing associated with documents, data, or other information routed therewith. For example, in one implementation, the controls may define various security, formatting, auditing, or other business requirements to ensure that the routing destination will properly handle the documents, data, or other information routed thereto and create an appropriate audit trail to track transactions that may be performed in relation to the routed documents, data, or other information. As such, the universal endpoint addressing schema may substantially reduce the processing cycles associated with processing the documents, data, and related information into business applications and substantially increase confidence that the documents, data, and related information will be securely on-ramped (e.g., captured) and processed.

According to one aspect of the invention, the universal endpoint addressing schema provided in the system and method described herein may generally provide a naming mechanism that can assign a globally unique identifier to any suitable endpoint where documents may be routed, which may include routing endpoints used to transmit documents in addition to routing endpoints used to receive documents. Additionally, in one implementation, the globally unique identifier (or universal endpoint address) can be linked to one or more tickets associated with the workflow steps, processing stages, or other appropriate business rules that enforce proper processing associated with documents, data, or other information in transit between originating and destination routing endpoints, wherein the same routing endpoint may be the originating or destination endpoint depending on the particular use case.

Accordingly, the universal endpoint addressing schema may substantially expand the routing endpoints that can be suitably addressed to any suitable routing destination that can have documents and related information routed thereto. Furthermore, the universal endpoint addressing schema may integrate workflow capabilities and business rules into the processes that are used to route documents, data, or related information and create audit trails to track transactions that use the documents, data, or related information in transit.

According to one aspect of the invention, because universal endpoint addresses created with the universal endpoint address schema described herein can be linked to tickets associated with workflow steps, processing stages, and appropriate business rules, the universal endpoint address may be encapsulated with document data or other information that can be stored in cloud or virtualized data centers to request documents, data, or related services from third-parties that have appropriate capabilities to respond to the request. For example, a particular third-party may provide documents, data, or other services to resolve the request associated with the ticket, and the universal endpoint address and any workflow steps, processing stages, business rules, or other intelligence embedded in the ticket may be used to validate whether the provided documents, data, or other services suitably resolve the request.

As such, in response to the workflow steps, processing stages, business rules, or other embedded intelligence validating that the request has been suitably resolved, the workflow steps, processing stages, business rules, or other embedded intelligence may use the universal endpoint address associated with the ticket to properly route the response to an entity that submitted the request into the cloud or virtualized data center. Accordingly, in one implementation, the universal endpoint addressing schema may natively connect document routing endpoints, business rules, workflow requirements, and other relevant business intelligence, which may substantially simplify how documents, data, and related information will be processed into business applications, increase security associated with requesting document-related services from third-parties and receiving responses thereto, and create audit trails that can be used to validate adherence to any requirements associated with the request.

According to one aspect of the invention, the system and method described herein may further provide various mechanisms to create encapsulated workflow packages that embed full on-ramping requirements relating to documents, data, or other information further embedded therein, whereby the encapsulated workflow packages may be used to securely manage sharing or otherwise distribution documents, data, and other information to third-parties.

For example, in one implementation, the encapsulated workflow packages may embed workflow steps and security, formatting, and auditing rules relating to how third-parties or other devices that participate in on-ramping documents, data, or other information encapsulated therein can process or otherwise use the documents, data, or other information, which may substantially reduce or remove any concerns about how third-parties will ultimately capture, process, and route the documents, data, or other information encapsulated in the workflow packages. In particular, the encapsulated workflow packages may be routed to one or more servers or other engines that can carry out the workflow steps embedded therein prior to delivering the encapsulated workflow packages to third-party routing endpoints, and furthermore, once delivered to the third-party routing endpoints, the encapsulated workflow packages may continue to enforce the workflow steps and other rules embedded therein to ensure that the third-party routing endpoints will adhere to the appropriate workflow steps and associated rules. Accordingly, the encapsulated workflow packages may ensure compliance with security, business efficiency, and regulatory requirements across organizational boundaries.

According to one aspect of the invention, the encapsulated workflow packages created and managed with the system and method described herein may embed complete on-ramping requirements associated with documents, data, or other information captured therein in order to make business workflow steps and security, formatting, and auditing rules addressable in environments located outside an institution where the encapsulated workflow package was created. For example, an encapsulated workflow package that embeds workflow process steps and any documents, business rules, or other requirements or restrictions associated therewith may be created at a system associated with a requesting institution and subsequently delivered or otherwise distributed to another system in a third-party receiving institution. The system in the third-party receiving institution may then load the encapsulated workflow package using a suitable workflow application, which may unpack the workflow process steps and documents, business rules, restrictions, or other requirements encapsulated therein.

As such, the business rules, restrictions, or other requirements in the encapsulated workflow package may cause the workflow application at the third-party institution to properly enforce business intelligence associated therewith, which may include requiring that certain on-ramped documents be encrypted or secured, creating an audit trail to track and characterize activities or transactions that interact with the encapsulated workflow package or any information embedded therein, routing the encapsulated workflow package to a next hop that the workflow steps may define in response to a current workflow step properly completing, and controlling access to prevent modifications to the contents associated with the encapsulated workflow package or restricting modifications to authorized users, among other things. As such, the encapsulated workflow package may enable controlled collaboration across various locations or organizational boundaries in a manner that preserves application integrity and business requirements.

Other advantages of the invention will be apparent to those skilled in the art based on the following drawings and detailed description.

BRIEF DESCRIPTION OF THE DRAWINGS

FIG. 2 illustrates an exemplary ticket to route documents and manage document workflows using a universal endpoint address, according to one aspect of the invention.

DETAILED DESCRIPTION

Figure 1:
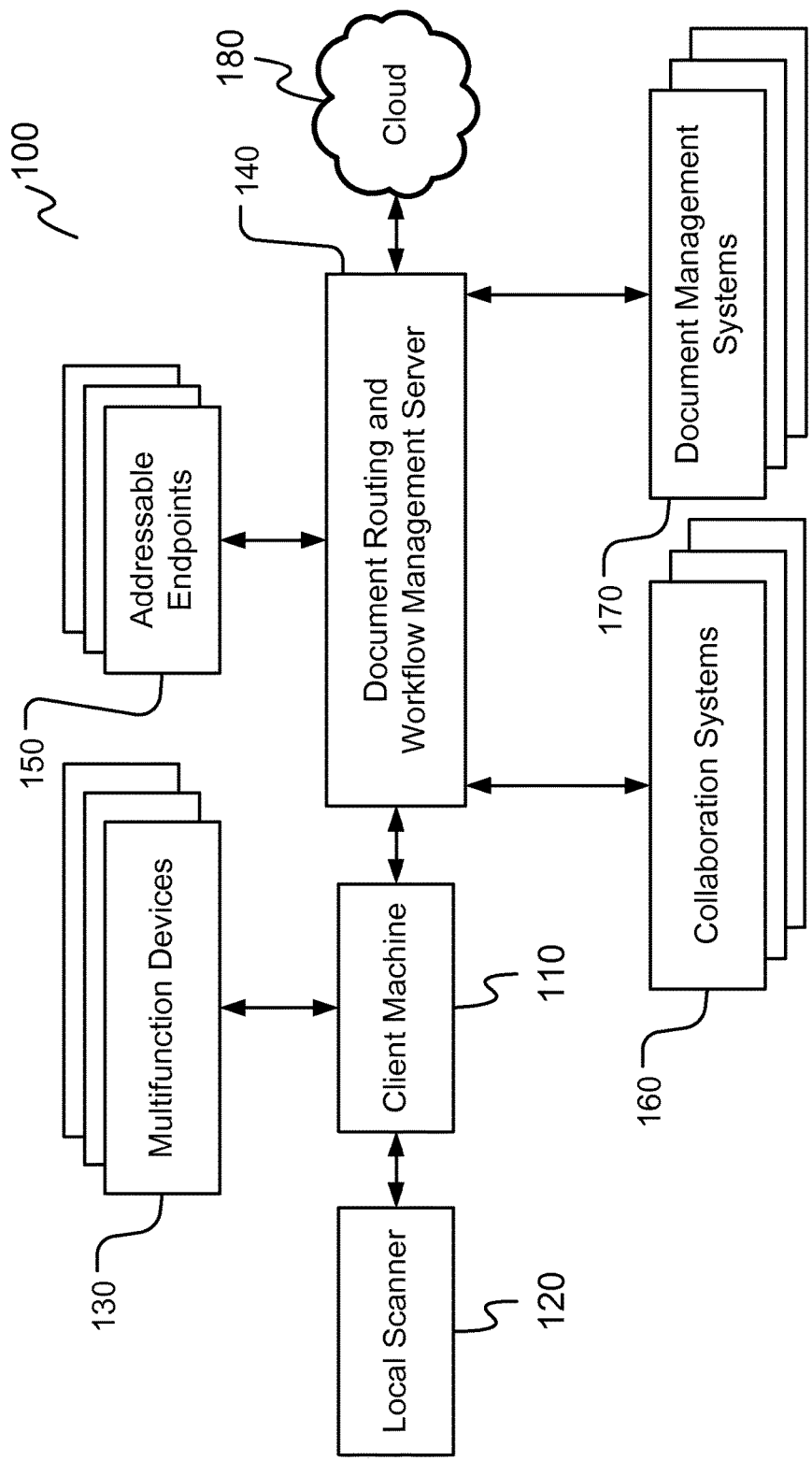
FIG. 1 illustrates an exemplary system that may provide a universal endpoint address schema to route documents and manage document workflows, wherein the system shown in FIG. 1 may further be used to create and manage encapsulated workflow packages, according to one aspect of the invention.

According to one aspect of the invention, FIG. 1 illustrates an exemplary system 100 that may provide a universal endpoint address schema to route documents and manage document workflows, wherein the system 100 shown in FIG. 1 may further be used to create and manage encapsulated workflow packages. In particular, the system 100 illustrated in FIG. 1 may employ the universal endpoint address schema to specify a globally unique address that can be used to route documents to any addressable destination. For example, in one implementation, the addressable destinations that can be identified with the globally unique address specified via the universal endpoint address schema may include a client machine 110 that can process and route electronic files in substantially the same manner that paper documents are typically processed and routed, a local scanner 120 that can be used to send and route documents to business applications, and multifunction devices 130 that can securely process and route information associated with document-driven business applications (e.g., machines that combine printer, scanner, photocopier, fax, and/or e-mail functionality). In addition, the addressable destinations may include one or more endpoints 150 having finer granularity levels, including local or remote files or folders (e.g., residing on the client machine 110 or other devices), e-mail, fax, FTP, or other servers, Open Database Connectivity (ODBC)-compliant databases, or other suitable addressable endpoints 150. Further still, the addressable destinations may include various collaboration systems 160 and document management systems 170 that a business may employ to archive, index, search, retrieve, or otherwise reference documents, data, and related information (e.g., SharePoint, Documentum, Interwoven, IBM CM, FileNet, Open Text eDocs and Livelink, Captaris, Docushare, etc.).

As such, in one implementation, the universal endpoint address schema employed in the system 100 shown in FIG. 1 may provide capabilities to link documents, data, and related information transmitted to or from the routing destinations with workflow steps and processing rules that can enforce security, formatting, auditing, and other business constraints and generate tickets that can be used to request documents, data, or related services from third-parties in cloud or virtualized data centers 180, thereby extending collaboration beyond the boundaries of an enterprise and partners or customers associated therewith. For example, in one implementation, the universal endpoint addressing schema may specify various parameters or other criteria that a document routing and workflow management server 140 may use to create globally unique identifiers that assign certain numbers, names, or other information to the document routing endpoints in order to uniquely identify the document routing endpoints. For example, in one implementation, the universal endpoint address schema may uniquely represent the client machine 110, the local scanner, and/or the multifunction devices 130, collaboration systems, document management systems 170, or other suitable endpoints 150 with network addresses, names, and/or other unique criteria associated therewith, while local or remote files or folders 150 may be uniquely represented with certain unique file system criteria (e.g., hash values that uniquely represent contents associated therewith). Alternatively, the universal endpoint address schema may employ any other suitable mechanism that can uniquely identify the document routing endpoints. Further, in one implementation, the document routing and workflow management server 140 may link the globally unique identifiers created to uniquely identify the document routing endpoints to workflow steps, processing stages, or other business rules that can enforce proper processing associated with documents, data, or other information routed therewith and address various governance, risk, compliance, and other security concerns.

In one implementation, to create the universal endpoint addressing schema, users may generally provide information to the document routing and workflow management server 140 that identifies or otherwise points to a suitable addressable routing destination, which may include the client machine 110, the local scanner 120, one or more multifunction devices 130, one or more collaboration systems 160, one or more document management systems 170, or another addressable endpoint 150. In response thereto, the document routing and workflow management server 140 may create the globally unique identifier to address the identified routing destination, which the users may then employ to send documents, data, or other information to the routing destination. In one implementation, the document routing and workflow management server 140 may further link the globally unique identifier to one or more workflow steps, processing stages, or other business rules that specify various controls to enforce proper processing associated with documents, data, or other information routed therewith. For example, in one implementation, the controls may define various security, formatting, auditing, or other business requirements to ensure that the routing destination will properly handle the documents, data, or other information that may be routed thereto (via the document routing and workflow management server 140), and the controls may further define requirements to create an appropriate audit trail to track transactions that may be performed in relation to the routed documents, data, or other information (e.g., in cloud or virtualized data centers 180, at third-party institutions, or other destination addressed with the globally unique identifier). As such, universal endpoint addressing schema may substantially reduce the processing cycles associated with the system 100 processing the documents, data, and related information into business applications (e.g., the collaboration systems 160, document management systems 170, etc.), and may further substantially increase confidence that the document routing and workflow management server 140 will be able to securely on-ramp and control processing associated with the routed documents, data, and related information.

Additionally, in one implementation, the globally unique identifier (which may alternatively be called a universal endpoint address) can be linked to one or more tickets associated with the workflow steps, processing stages, or other appropriate business rules that enforce proper processing associated with documents, data, or other information in transit between originating and destination routing endpoints, wherein the same routing endpoint may be the originating or destination endpoint depending on the particular use case. For example, in one implementation, a ticket linked to a particular universal endpoint address may be further linked to any workflow steps, processing stages, and appropriate business rules associated with the universal endpoint address, whereby the ticket may encapsulate the documents, data, or related information associated with the universal endpoint address. As such, in response to receiving on-ramping or other routing instructions associated with the universal endpoint address, the document routing and workflow management server 140 may upload the ticket linked thereto into the cloud or virtualized data center 180 to request documents, data, or related services from third-parties that have appropriate capabilities to respond to the request. For example, a particular third-party may provide documents, data, or other services into the cloud or virtualized data center 180 to resolve the request associated with the ticket, and the universal endpoint address and any workflow steps, processing stages, business rules, or other intelligence embedded in the ticket may be used to validate whether the provided documents, data, or other services suitably resolve the request.

As such, in one implementation, the workflow steps, processing stages, business rules, or other intelligence embedded in the ticket may use the universal endpoint address associated therewith to properly route the response to an entity that submitted the request into the cloud or virtualized data center 180 in response to the workflow steps, processing stages, business rules, or other embedded intelligence validating that the request has been suitably resolved.

Accordingly, the universal endpoint addressing schema may natively connect document routing endpoints, business rules, workflow requirements, and other relevant business intelligence, which may substantially simplify how documents, data, and related information will be processed into business applications, increase security associated with requesting document related services from third-parties and receiving responses thereto, and create audit trails that can be used to validate adherence to any requirements associated with the request.

In one implementation, an exemplary use case employing the universal endpoint address schema may include the document routing and workflow management server 140 assigning a universal endpoint address to a desktop folder 150, wherein the document routing and workflow management server 140 may provide the universal endpoint address assigned to the desktop folder 150 to a user that requested the universal endpoint address. As such, the requesting user may then place one or more documents on the local scanner 120 or multifunction device 130 (e.g., a copier feeder) and enter the universal endpoint address assigned to the desktop folder 150 on an interface associated with the local scanner 120 or multifunction device 130.

The local scanner 120 or multifunction device 130 may then scan and route the documents to the document routing and workflow management server 140, which may recognize the universal endpoint address entered on the interface and upload the scanned documents into the cloud or virtualized data center 180. In one implementation, the cloud or virtualized data center 180 may include one or more processing nodes that have routing definitions associated with the universal endpoint address assigned to the desktop folder 150, whereby the appropriate processing nodes in the cloud or other virtualized data center 180 may route the scanned documents and related information to a server or other suitable interface in an institution where the desktop folder 150 exists.

The server or other interface in that institution may then recognize that the universal endpoint address associated with the incoming documents and related information represents the desktop folder 150 and therefore route the incoming documents and related information to that location. Furthermore, if the universal endpoint address assigned to the desktop folder 150 has any workflow steps or processing rules associated therewith, the document routing and workflow management server 140, the processing nodes in the cloud or virtualized data center 180, and/or the server or other interface in the receiving institution may execute the associated workflow steps or processing rules prior to depositing the documents and related information into the desktop folder 150, and moreover, an audit trail relating to activities used to route the documents from the originating institution to the desktop folder 150 may be created to track the entire process.

In one implementation, another exemplary use case employing the universal endpoint address schema may operate in a substantially similar manner to the use case described above, while further using the universal endpoint address to associate one or more endpoints with a predefined workflow. For example, a particular institution may have an invoice processing workflow that has steps to obtain certain inputs, process invoices into one or multiple enterprise resource planning destinations, and trigger other business rules relating to invoice processing.

Thus, a workflow step that relates to on-ramping documents relating to the invoice into the appropriate workflow may be represented via the universal endpoint address, which may be provided to a supplier that can use a mobile device camera or other suitable device to capture a document and send the captured image or information obtained therefrom (e.g., via optical character recognition) to the universal endpoint address that represents the on-ramping workflow step. In one implementation, the invoice processing workflow may alternatively (or additionally) be triggered in response to the institution receiving the captured image associated with the document or the information obtained therefrom.

In one implementation, as noted above, the system 100 shown in FIG. 1 may further include various mechanisms that may be used to create and manage encapsulated workflow packages. In particular, the encapsulated workflow packages may generally specify various requirements that the document routing and workflow management server 140 may use to on-ramp or otherwise route documents, data, or other information captured therein, including any necessary workflow steps that can be enforced on other devices, entities, or routing endpoints that may participate in on-ramping the documents, data, or information embedded therein, including third-party devices, users in third-party institutions, or in other locations that reside outside the boundaries associated with an organization where the encapsulated workflow packages and embedded on-ramping requirements were created.

In a related sense, the encapsulated workflow packages may include hard-coded rules to ensure compliance with security, business efficiency, and regulatory requirements across organizational boundaries. Accordingly, the encapsulated workflow packages may substantially eliminate or reduce concerns about how the documents, data, or other information encapsulated therein will be captured, routed, and processed prior to, during, and after delivery into the routing endpoints that interact with or otherwise participate in on-ramping the encapsulated workflow packages.

More particularly, in one implementation, the encapsulated workflow packages may define the documents, data, and other information captured therein and specify how routing endpoints that receive the encapsulated workflow packages should process the documents, data, and other information captured therein. As such, the encapsulated workflow packages may provide a complete picture relating to how the documents, data, or other information captured therein should be secured, formatted, and processed (e.g., via coded and encapsulated rules that specify requirements to ensure compliance with security, business efficiency, and regulatory requirements across organizational boundaries).

Accordingly, as will be described in further detail herein, the encapsulated workflow packages may be used to securely share or otherwise distribute documents, data, and other information to third-parties, which may include routing endpoints that access the encapsulated workflow packages via the cloud or virtualized data center 180. For example, as noted above, the encapsulated workflow packages may embed workflow steps and security, formatting, and auditing rules to control how third-parties or other routing endpoints that participate in on-ramping the documents, data, or information encapsulated therein can process or otherwise use the encapsulated workflow packages, whereby the document routing and workflow management server 140 may route the encapsulated workflow packages to one or more servers or other engines that can carry out the workflow steps embedded therein prior to, during, and following delivery to routing endpoints at third-party (receiving) locations.

Furthermore, in one implementation, embedding the workflow steps and other business intelligence into the encapsulated workflow packages may ensure that the encapsulated workflow packages can independently enforce the workflow steps and other business intelligence embedded therein following delivery to the third-party routing endpoints and thereby ensure that the third-party routing endpoints will adhere to the appropriate workflow steps and associated business intelligence and comply with security, business efficiency, and regulatory requirements across organizational boundaries.

In one implementation, the encapsulated workflow packages may be XML packages or other suitable data structures that include information linked to the universal endpoint addressing schema described above and complete on-ramping requirements associated with documents, data, or other information captured or otherwise embedded therein. In particular, the document routing and workflow management server 140 that routes the encapsulated workflow packages may associate the encapsulated workflow packages with the appropriate workflow steps and business requirements, thereby making the workflow steps and business requirements addressable across organizational boundaries, including at routing endpoints located in third-party institutions or environments other than institutions where the encapsulated workflow packages were created.

For example, in one implementation, the document routing and workflow management server 140 may be located in a requesting institution where a particular encapsulated workflow package was created, wherein the document routing and workflow management server 140 may subsequently deliver or otherwise distribute the encapsulated workflow package to a routing endpoint located in a third-party (receiving) institution.

The routing endpoint located in the third-party institution may then load the encapsulated workflow package using a suitable workflow application, which may unpack the documents, data, and other information embedded therein in addition to any workflow steps, business rules, restrictions, business intelligence, or other requirements encapsulated therein. As such, the workflow steps, business rules, restrictions, business intelligence, or other requirements in the encapsulated workflow package may cause the workflow application at the third-party institution to properly enforce the requirements, which may include requirements to encrypt or secure certain on-ramped documents included therein, create an audit trail to track activities or transactions that interact with the encapsulated workflow package or any information embedded therein, route the encapsulated workflow package to a next hop that the workflow steps may define in response to a current workflow step properly completing, and enforce access controls to prevent modifications to the contents associated with the encapsulated workflow package or restrict modifications to authorized users, among other things. As such, the encapsulated workflow package may include various features to enable controlled collaboration across various locations or organizational boundaries in a manner that preserves application integrity and business requirements.

In one implementation, an exemplary use case that may employ the encapsulated workflow packages described above may include a process to archive electronic documents, wherein an originating institution may define one or more workflow steps to create a workflow process that defines all necessary requirements, restrictions, and business intelligence to archive electronic documents. As such, the document routing and workflow management server 140 may then embed the workflow steps in the encapsulated workflow package and assign a package identifier to the workflow process associated with the encapsulated workflow process, wherein the package identifier may optionally be specified via the universal endpoint addressing schema described above.

In one implementation, the document routing and workflow management server 140 may then distribute the encapsulated workflow package to an entity in the originating institution, a third-party institution, or various combinations thereof, wherein anyone using the package identifier assigned to the workflow process may have the ability to download the encapsulated workflow package and browse the requirements, restrictions, and business intelligence defined therein. Furthermore, the business intelligence built into the encapsulated workflow package may prevent modifications to contents associated therewith (e.g., providing read-only access), which may prevent unauthorized or non-compliant changes to the encapsulated workflow package.

In one implementation, in response to any entity sending or otherwise on-ramping documents, data, or other information that reference the package identifier, the business intelligence and workflow steps embedded in the encapsulated workflow package may be triggered to control how the documents, data, or other information will be processed at a routing endpoint that receives the on-ramped documents, data, or other information that reference the package identifier. As such, the embedded workflow steps and business intelligence may "freeze" the encapsulated workflow package once routed into environments outside the originating institution to require that outside entities adhere to the capture rules defined in the encapsulated workflow packages.

According to one aspect of the invention, FIG. 2 illustrates an exemplary ticket 200 that may be used to route documents and manage document workflows (e.g., using the universal endpoint address schema described in further detail above). In particular, the ticket 200 illustrated in FIG. 2 may be generated on a document routing and workflow management server and include printed or electronic information to represent a universal endpoint address associated with a document routing endpoint and specify one or more workflow steps or other business intelligence to control transmitting certain documents, data, or other information to the document routing endpoint.

In one implementation, the ticket 200 may include a printed barcode or an electronic signature that represents the universal endpoint address associated with a document routing endpoint, wherein the printed barcode or electronic signature may be associated with metadata that describes one or more document handling options to instruct the document routing and workflow management server about how to scan, index, archive, route, store, or otherwise process the documents, data, or other information linked to the ticket 200. For example, the document handling options associated with the ticket 200 shown in FIG. 2 may instruct the document routing and workflow management server to perform optical character recognition ("OCR") on the documents linked to the ticket 200, convert the document into a PDF file, and store the PDF file and any information obtained in the optical character recognition process in a document management system.

Furthermore, in one implementation, the metadata associated with the ticket 200 may specify a user that created the ticket 200 and the corresponding universal endpoint address associated therewith (e.g., user "BJones" managed in domain number one, "DOM1"), a user that requested the ticket 200 (the same user in the example shown in FIG. 2), expiration criteria associated with the ticket 200 (e.g., no expiration or a certain an expiration date and/or time), usage criteria associated with the ticket 200 (e.g., unlimited or constrained), and one or more types associated with the documents, data, or other information linked to the ticket 200 (e.g., invoices, contracts, leases, insurance claims, etc.).

In one implementation, the document routing and workflow management server may further support routing the ticket 200 and the documents, data, or other information linked thereto to multiple destinations simultaneously. For example, as shown in FIG. 2, the ticket 200 may include instructions to route the documents, data, or other information associated therewith in an e-mail to certain recipients, in a fax to certain organizations, in a PDF file to be saved in certain folders and/or stamped and stored in certain collaboration systems or document management systems.

Moreover, as noted above, the ticket 200 may reference one or more workflow steps or other business intelligence to ensure that the documents, data, or other information linked thereto will be properly secured, formatted, tracked, or otherwise processed when on-ramped to a document routing network, while the documents, data, or information are in-transit to the specified destinations, and subsequent to the document routing network having delivered the documents, data, or information to the specified destinations. Accordingly, the ticket 200 shown in FIG. 2 may save time and substantially simplify how document workflows are managed in addition to ensuring that critical data will be consistently and accurately processed in a manner that adheres to governance, risk, compliance, and other security requirements.

Figure 3:
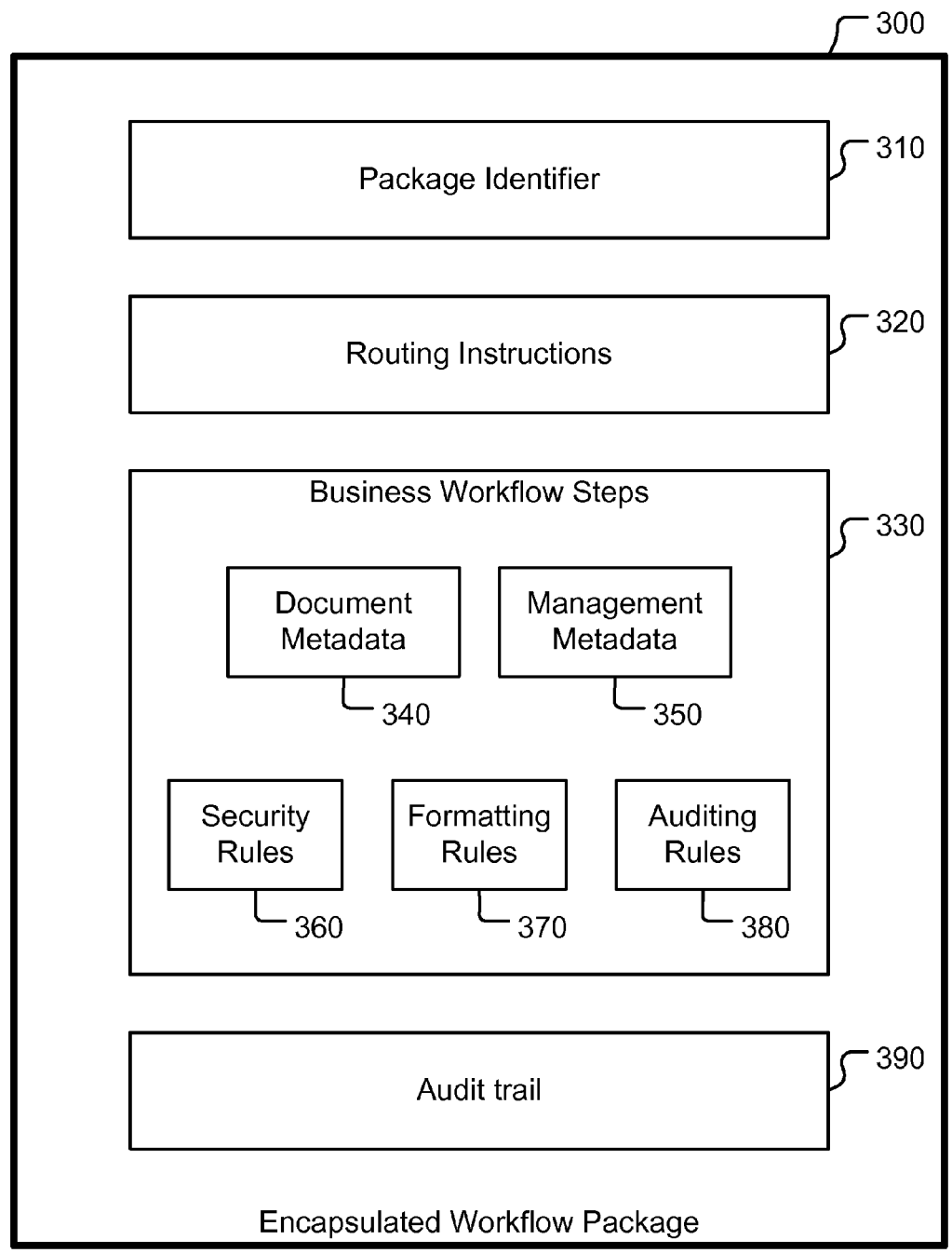
FIG. 3 illustrates an exemplary encapsulated workflow package that the system and method described herein may create and manage, according to one aspect of the invention.

According to one aspect of the invention, FIG. 3 illustrates an exemplary encapsulated workflow package 300 that may be created and managed using the system 100 illustrated in FIG. 1 and described in further detail above, and which may be routed and further managed using the coversheet 300 illustrated in FIG. 3 and described in further detail above. More particularly, in one implementation, the encapsulated workflow packages may define the documents, data, and other information captured therein and specify how routing endpoints that receive the encapsulated workflow packages should process the documents, data, and other information captured therein. As such, the encapsulated workflow packages may provide a complete picture relating to how the documents, data, or other information captured therein should be secured, formatted, and processed (e.g., via coded and encapsulated rules that specify requirements to ensure compliance with security, business efficiency, and regulatory requirements across organizational boundaries). Accordingly, as will be described in further detail herein, the encapsulated workflow packages may be used to securely share or otherwise distribute documents, data, and other information to third-parties, which may include routing endpoints that access the encapsulated workflow packages via the cloud or virtualized data center 180.

In one implementation, encapsulated workflow package 300 may include a package identifier 310 that identifies the package and is associated with the content of encapsulated workflow package 300. For example, using the package identifier 310, encapsulated workflow package 300 may be identified and unpacked to obtain its contents.

In one implementation, the encapsulated workflow package 300 illustrated in FIG. 3 may generally specify various requirements that a document routing and workflow management server may use to on-ramp or otherwise route documents, data, or other information captured therein. In one implementation, the requirements may include routing instructions 320 that specify one or more destinations to receive the documents, data, or other information captured in the encapsulated workflow package 300. For example, routing instructions 320 may include instructions to route the documents, data, or other information associated therewith in an e-mail to certain recipients, in a fax to certain organizations, in a PDF file to be saved in certain folders and/or stamped and stored in certain collaboration systems or document management systems.

In one implementation, the requirements may include workflow steps 330 that can be enforced on the destinations that will receive the documents, data, or other information, including routing endpoints located outside the boundaries associated with an organization where the encapsulated workflow package 300 was created. Workflow steps 330 may include or otherwise be associated with information that is used to enforce various processes defined therein. In one implementation, for example, workflow steps 330 may include or otherwise be associated with document metadata 340, which may specify a user, a department, or one or more types of document (e.g., invoices, contracts, leases, insurance claims, file format, etc.) associated with the documents, data, or other information for which the workflow package pertains.

In one implementation, workflow steps 330 may include or otherwise be associated with management metadata 350 that may describes one or more document handling options to instruct the document routing and workflow management server about how to scan, index, archive, route, store, or otherwise process the documents, data, or other information. For example, management metadata 350 may instruct the document routing and workflow management server to perform OCR on the documents associated with the workflow package, convert the document into a PDF file, and store the PDF file and any information obtained in the optical character recognition process in a document management system.

In one implementation, workflow steps 330 may include or otherwise be associated with hard-coded rules to ensure compliance with security, business efficiency, and regulatory requirements across organizational boundaries. Accordingly, encapsulated workflow package 300 may substantially eliminate or reduce concerns about how the documents, data, or other information encapsulated therein will be captured, routed, and processed prior to, during, and after delivery into the routing endpoints that interact with or otherwise participate in on-ramping the encapsulated workflow packages.

For example, workflow steps 330 may include or otherwise be associated with security rules 360, formatting rules 370, and auditing rules 380 to control how third-parties or other routing endpoints that participate in on-ramping the documents, data, or information encapsulated therein can process or otherwise use the encapsulated workflow packages, whereby the document routing and workflow management server 140 may route encapsulated workflow package 300 to one or more servers or other engines that can carry out the workflow steps embedded therein prior to, during, and following delivery to routing endpoints at third-party (receiving) locations. Furthermore, in one implementation, embedding the workflow steps 330 and other business intelligence into the encapsulated workflow package 300 may ensure that the encapsulated workflow package can independently enforce the workflow steps and other business intelligence embedded therein following delivery to the third-party routing endpoints and thereby ensure that the third-party routing endpoints will adhere to the appropriate workflow steps and associated business intelligence and comply with security, business efficiency, and regulatory requirements across organizational boundaries.

In one implementation, encapsulated workflow package 300 may be an XML package or other suitable data structure that includes information linked to the universal endpoint addressing schema described above and complete on-ramping requirements associated with documents, data, or other information captured or otherwise embedded therein. In particular, the document routing and workflow management server 140 that routes the encapsulated workflow package 300 may associate the encapsulated workflow package with the appropriate workflow steps 330 and business requirements, thereby making the workflow steps and business requirements addressable across organizational boundaries, including at routing endpoints located in third-party institutions or environments other than institutions where the encapsulated workflow packages were created. For example, in one implementation, the document routing and workflow management server 140 may be located in a requesting institution where a particular encapsulated workflow package was created, wherein the document routing and workflow management server 140 may subsequently deliver or otherwise distribute the encapsulated workflow package to a routing endpoint located in a third-party (receiving) institution.

The routing endpoint located in the third-party institution may then load encapsulated workflow package 300 using a suitable workflow application, which may unpack the documents, data, and other information embedded therein in addition to any workflow steps, business rules, restrictions, business intelligence, or other requirements encapsulated therein. As such, the workflow steps, business rules, restrictions, business intelligence, or other requirements in the encapsulated workflow package may cause the workflow application at the third-party institution to properly enforce the requirements, which may include requirements to encrypt or secure certain on-ramped documents included therein, create an audit trail 390 to track activities or transactions that interact with the encapsulated workflow package or any information embedded therein, route the encapsulated workflow package to a next hop that the workflow steps may define in response to a current workflow step properly completing, and enforce access controls to prevent modifications to the contents associated with the encapsulated workflow package or restrict modifications to authorized users, among other things.

Accordingly, the encapsulated workflow package may include various features to enable controlled collaboration across various locations or organizational boundaries in a manner that preserves application integrity and business requirements. In one implementation, the encapsulated workflow package 300 may include or otherwise be associated with audit trail 390 such that as the encapsulated workflow package 300 is unpacked and processed, an audit trail can be created for each hop that the workflow steps may define.

Figure 4:
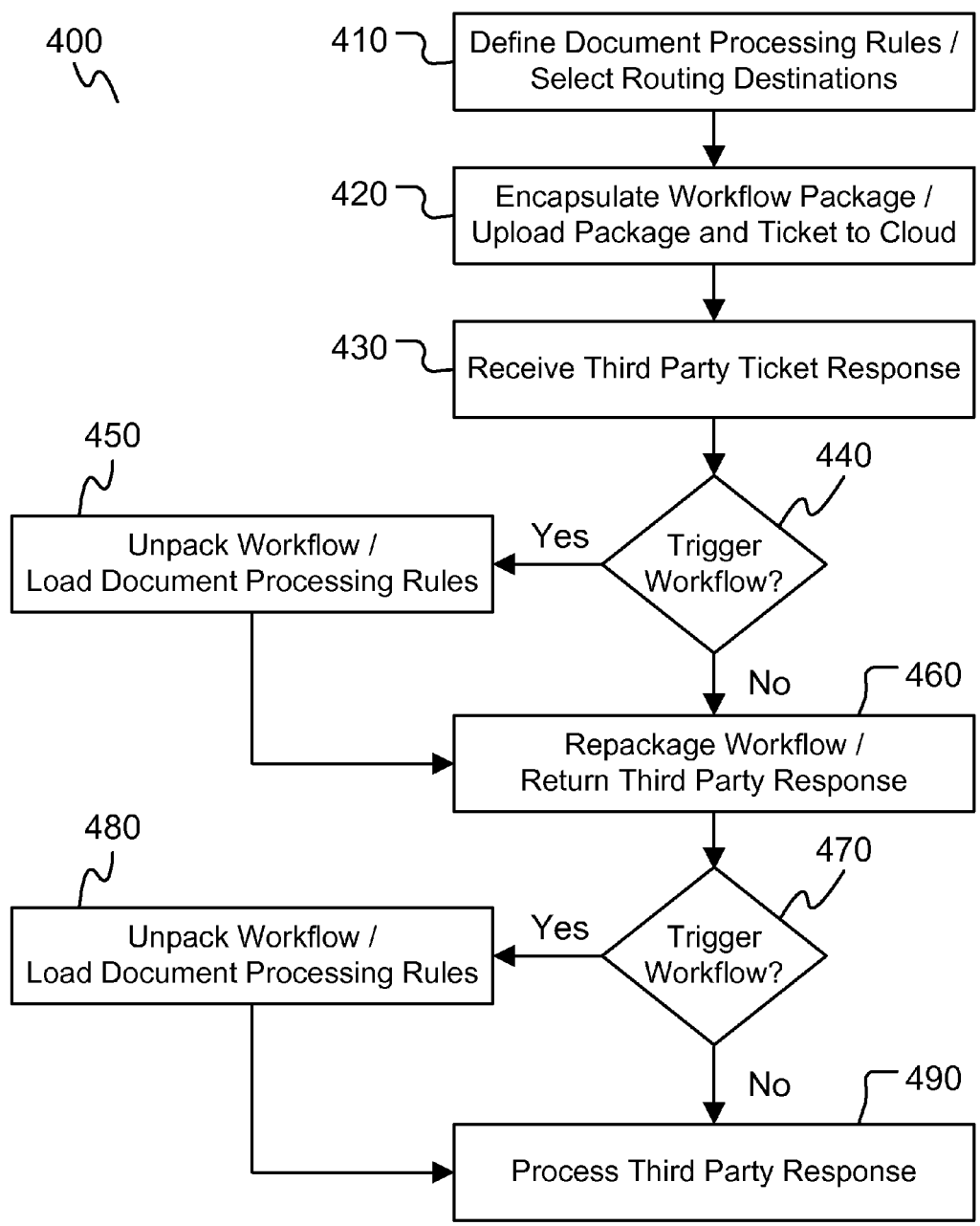
FIG. 4 illustrates an exemplary method to route documents and manage document workflows using a universal endpoint address schema, according to one aspect of the invention.

According to one aspect of the invention, FIG. 4 illustrates an exemplary method 400 that may be used to route documents and manage document workflows using a universal endpoint address schema. In particular, the method 400 illustrated in FIG. 4 may route documents and manage document workflows, which may be associated with the document and/or an addressable destination to which the document is routed.

In one implementation, in an operation 410 the method 400 shown in FIG. 4 may define a document processing rule and/or select a routing destination. For example, the processing rule may include one or more workflow steps, processing stages, or other business rules that specify various controls to enforce proper processing associated with documents, data, or other information routed therewith. The controls may define various security, formatting, auditing, or other business requirements to ensure that the routing destination will properly handle the documents, data, or other information that may be routed thereto (via the method 400), and the controls may further define requirements to create an appropriate audit trail to track transactions that may be performed in relation to the routed documents, data, or other information (e.g., in cloud or virtualized data centers 180, at third-party institutions, or other destination addressed with the globally unique identifier).

In one implementation, a routing destination may be selected based on a globally unique identifier that was input for routing the document. For example, an interface of a scanner device that scans a document to be routed may be used to receive the globally unique identifier, which identifies one or more addressable destinations to which the scanned document should be routed. In another example, a mobile device or other suitable device used to capture an image to be routed may be used to input the globally unique identifier.

In one implementation, in an operation 420, the method 400 may encapsulate a workflow package based on the document processing rule and/or routing destination, associate the workflow package with a ticket, and upload the package and ticket to the cloud for processing. In one implementation, the globally unique identifier can be linked to one or more tickets associated with the workflow steps, processing stages, or other appropriate business rules that enforce proper processing associated with documents, data, or other information in transit between originating and destination routing endpoints, wherein the same routing endpoint may be the originating or destination endpoint depending on the particular use case. For example, in one implementation, a ticket linked to a particular universal endpoint address may be further linked to any workflow steps, processing stages, and appropriate business rules associated with the universal endpoint address, whereby the ticket may encapsulate the documents, data, or related information associated with the universal endpoint address.

As such, in response to receiving on-ramping or other routing instructions associated with the universal endpoint address, the method 400 may upload the ticket linked thereto into the cloud or virtualized data center 180 to request documents, data, or related services from third-parties that have appropriate capabilities to respond to the request. For example, a particular third-party may provide documents, data, or other services into the cloud or virtualized data center 180 to resolve the request associated with the ticket, and the universal endpoint address and any workflow steps, processing stages, business rules, or other intelligence embedded in the ticket may be used to validate whether the provided documents, data, or other services suitably resolve the request.

In one implementation, in an operation 430, the method 400 may receive a third party ticket response. For example, the third party may include virtualized data center 180 or other third party providers that provide a response to the request.

In one implementation, in an operation 440, the method 400 may include determining whether a workflow should be triggered in association with the ticket and/or the document. For example, the ticket and/or the document may be associated with a workflow that should be executed. If in operation 440 a workflow is triggered, the method 400 may proceed to an operation 450, where the workflow is unpacked and any document processing rules therein are loaded. The method 400 may then process the document based on the processing rules. For example, a particular third-party may provide documents, data, or other services into the cloud or virtualized data center 180 to resolve the request associated with the ticket, and the universal endpoint address and any workflow steps, processing stages, business rules, or other intelligence embedded in the ticket may be used to validate whether the provided documents, data, or other services suitably resolve the request.

In one implementation, in an operation 460, the method 400 may repackage the workflow and return the third party response. Returning to operation 440, if a workflow is not triggered, the method 400 may proceed to operation 460, where the third party response is returned (note in this case when no workflow is triggered then the workflow need not be repackaged).

In one implementation, in an operation 470, the method 400 may determine whether a workflow should be triggered in association with the routing destination. For example, in one implementation, the routing destination may include a desktop folder 150 that is associated with workflow steps or processing rules. In this example, the method 400 may trigger the workflow and, in an operation 480, unpack the workflow and load the associated document processing rules. Upon processing the document based on the rules, the method 400 may proceed to an operation 490, where the third party response is processed. Returning to operation 470, if no workflow is triggered, the method 400 may proceed to operation 490.

Figure 5:
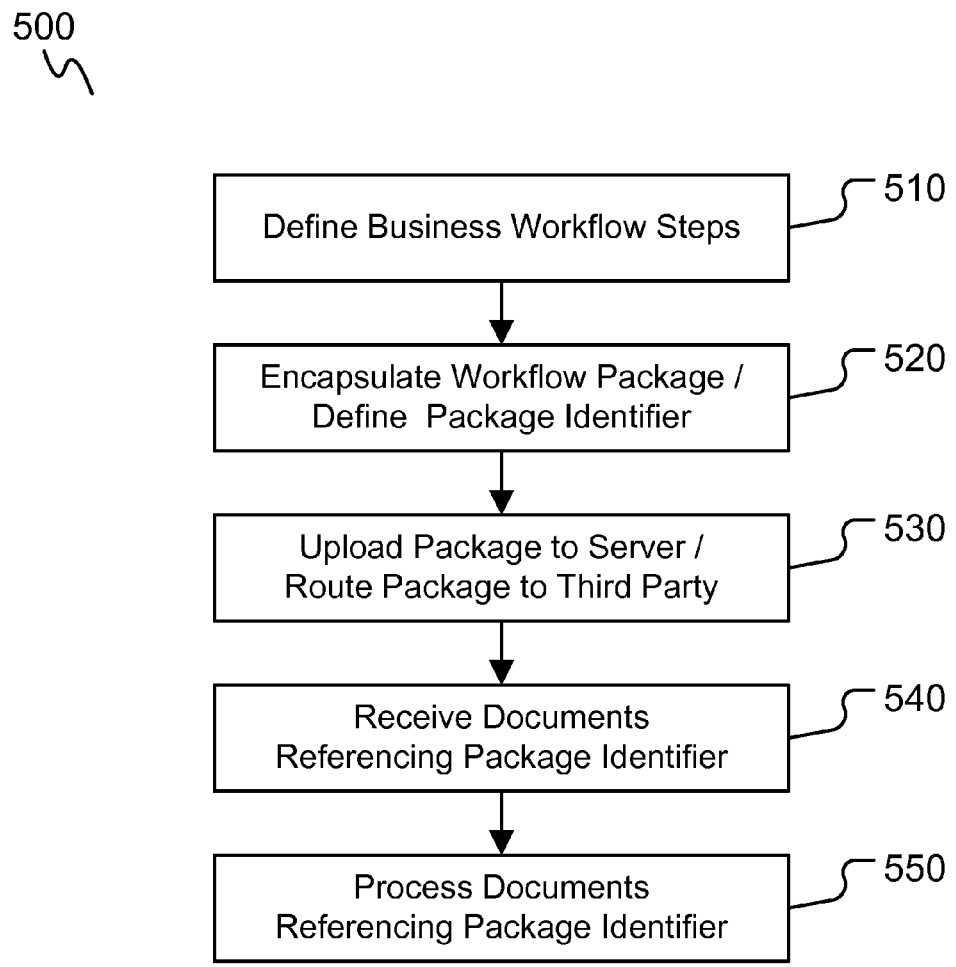
FIG. 5 illustrates an exemplary method that may be used to create and manage encapsulated workflow packages, according to one aspect of the invention.

According to one aspect of the invention, FIG. 5 illustrates an exemplary method 500 that may be used to create and manage encapsulated workflow packages. In particular, the method 500 illustrated in FIG. 5 may generally specify various requirements that the document routing and workflow management server 140 may use to on-ramp or otherwise route documents, data, or other information captured therein, including any necessary workflow steps that can be enforced on other devices, entities, or routing endpoints that may participate in on-ramping the documents, data, or information embedded therein, including third-party devices, users in third-party institutions, or in other locations that reside outside the boundaries associated with an organization where the encapsulated workflow packages and embedded on-ramping requirements were created.

In one implementation, in an operation 510, the method 500 may define business workflow steps. For example, the business workflow steps may include various controls or rules to ensure compliance with security, business efficiency, and regulatory requirements across organizational boundaries.

In one implementation, in an operation 520, the method 500 may encapsulate a workflow package and define a package identifier. The package identifier may be used to reference or otherwise identify the package. In one implementation, the encapsulated workflow packages may embed workflow steps and security, formatting, and auditing rules to control how third-parties or other routing endpoints that participate in on-ramping the documents, data, or information encapsulated therein can process or otherwise use the encapsulated workflow packages, whereby the method 500 may route the encapsulated workflow packages to one or more servers or other engines that can carry out the workflow steps embedded therein prior to, during, and following delivery to routing endpoints at third-party (receiving) locations.

Furthermore, in one implementation, embedding the workflow steps and other business intelligence into the encapsulated workflow packages may ensure that the encapsulated workflow packages can independently enforce the workflow steps and other business intelligence embedded therein following delivery to the third-party routing endpoints and thereby ensure that the third-party routing endpoints will adhere to the appropriate workflow steps and associated business intelligence and comply with security, business efficiency, and regulatory requirements across organizational boundaries.

In one implementation, the encapsulated workflow packages may be XML packages or other suitable data structures that include information linked to the universal endpoint addressing schema described above and complete on-ramping requirements associated with documents, data, or other information captured or otherwise embedded therein. In particular, the method 500 may associate the encapsulated workflow packages with the appropriate workflow steps and business requirements, thereby making the workflow steps and business requirements addressable across organizational boundaries, including at routing endpoints located in third-party institutions or environments other than institutions where the encapsulated workflow packages were created.

For example, in one implementation, the method 500 may be performed at a requesting institution where a particular encapsulated workflow package was created, wherein the method 500 may subsequently deliver or otherwise distribute the encapsulated workflow package to a routing endpoint located in a third-party (receiving) institution.

The encapsulated workflow packages may substantially eliminate or reduce concerns about how the documents, data, or other information encapsulated therein will be captured, routed, and processed prior to, during, and after delivery into the routing endpoints that interact with or otherwise participate in on-ramping the encapsulated workflow packages.

In one implementation, the encapsulated workflow packages may define the documents, data, and other information captured therein and specify how routing endpoints that receive the encapsulated workflow packages should process the documents, data, and other information captured therein. As such, the encapsulated workflow packages may provide a complete picture relating to how the documents, data, or other information captured therein should be secured, formatted, and processed (e.g., via coded and encapsulated rules that specify requirements to ensure compliance with security, business efficiency, and regulatory requirements across organizational boundaries).

In one implementation, in an operation 530, the method 500 may upload the package to a server and route the package to the cloud or a third party. In one implementation, the method 500 may distribute the encapsulated workflow package to an entity in the originating institution, a third-party institution, or various combinations thereof, wherein anyone using the package identifier assigned to the workflow process may have the ability to download the encapsulated workflow package and browse the requirements, restrictions, and business intelligence defined therein.

In one implementation, in an operation 540, the method 500 may receive, from the cloud or third party, the documents referencing the package identifier.

In one implementation, in an operation 550, the method 500 may process the received documents referencing the package identifier. For example, the business intelligence built into the encapsulated workflow package may be used to prevent modifications to contents associated therewith (e.g., providing read-only access), which may prevent unauthorized or non-compliant changes to the encapsulated workflow package. In one implementation, in response to any entity sending or otherwise on-ramping documents, data, or other information that reference the package identifier, the business intelligence and workflow steps embedded in the encapsulated workflow package may be triggered to control how the documents, data, or other information will be processed at a routing endpoint that receives the on-ramped documents, data, or other information that reference the package identifier. As such, the embedded workflow steps and business intelligence may "freeze" the encapsulated workflow package once routed into environments outside the originating institution to require that outside entities adhere to the capture rules defined in the encapsulated workflow packages.

Figure 6:
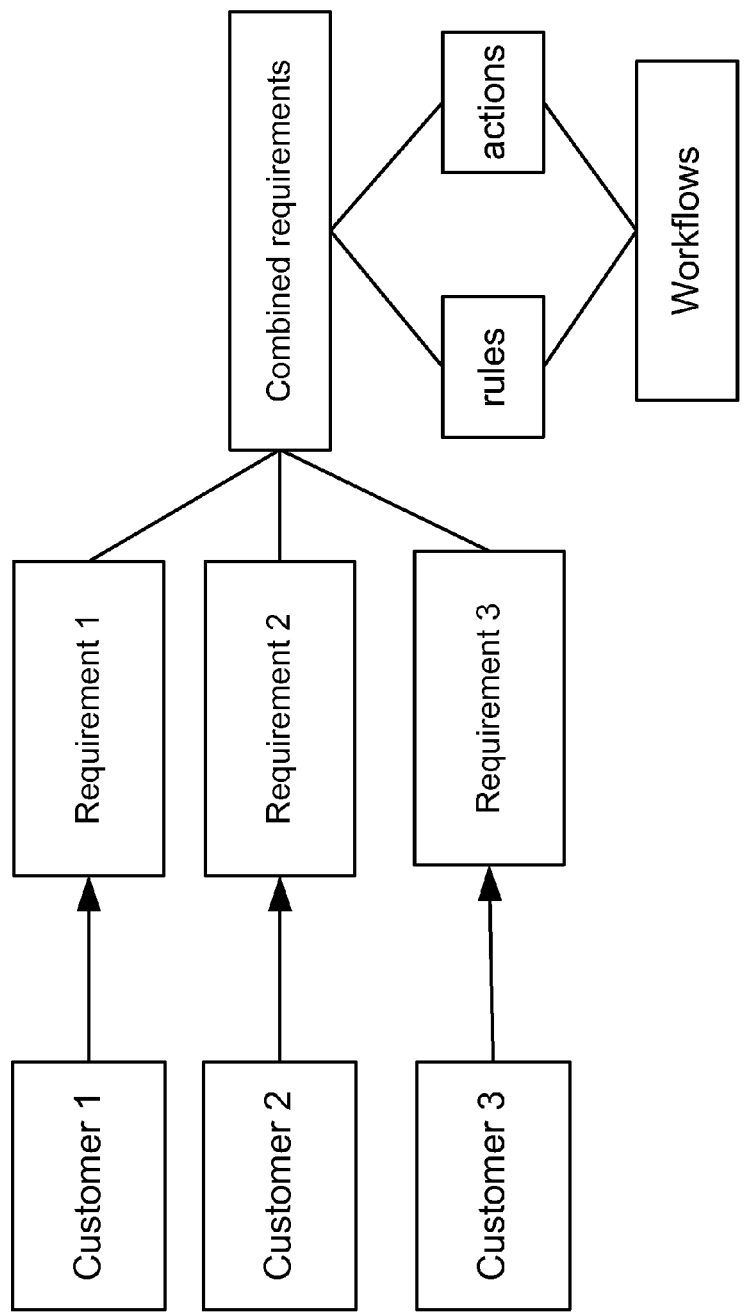
FIG. 6 shows an embodiment of the invention to determine workflows.
Figure 7:
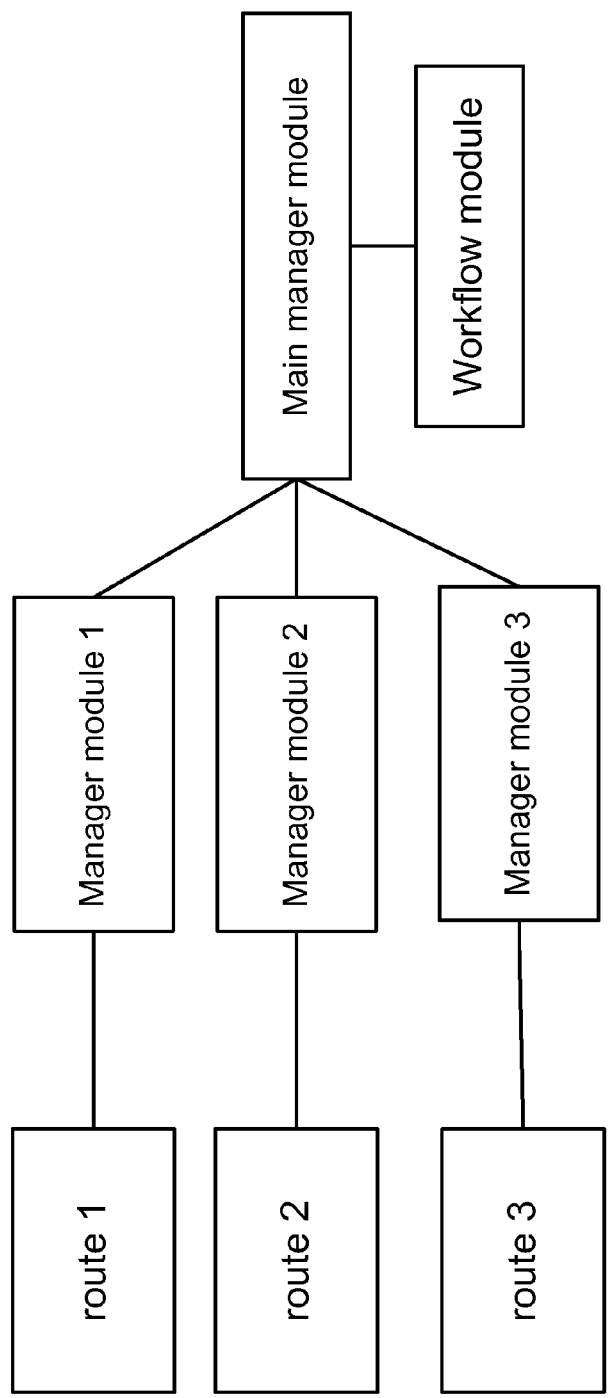
FIG. 7 shows an embodiment of the invention to determine workflows.

Other variations of the system or method of the invention are shown in the examples given below:

FIG. 6 shows an embodiment of the invention to determine workflows, based on various customers' requirements, which get combined, to determine rules and actions associated with the workflows, for example, to determine how and where or under what conditions the document goes to different routes or processed differently. FIG. 7 shows an embodiment of the invention to determine workflows, with manager modules for different routes, under a central main manager module.

Figure 8:
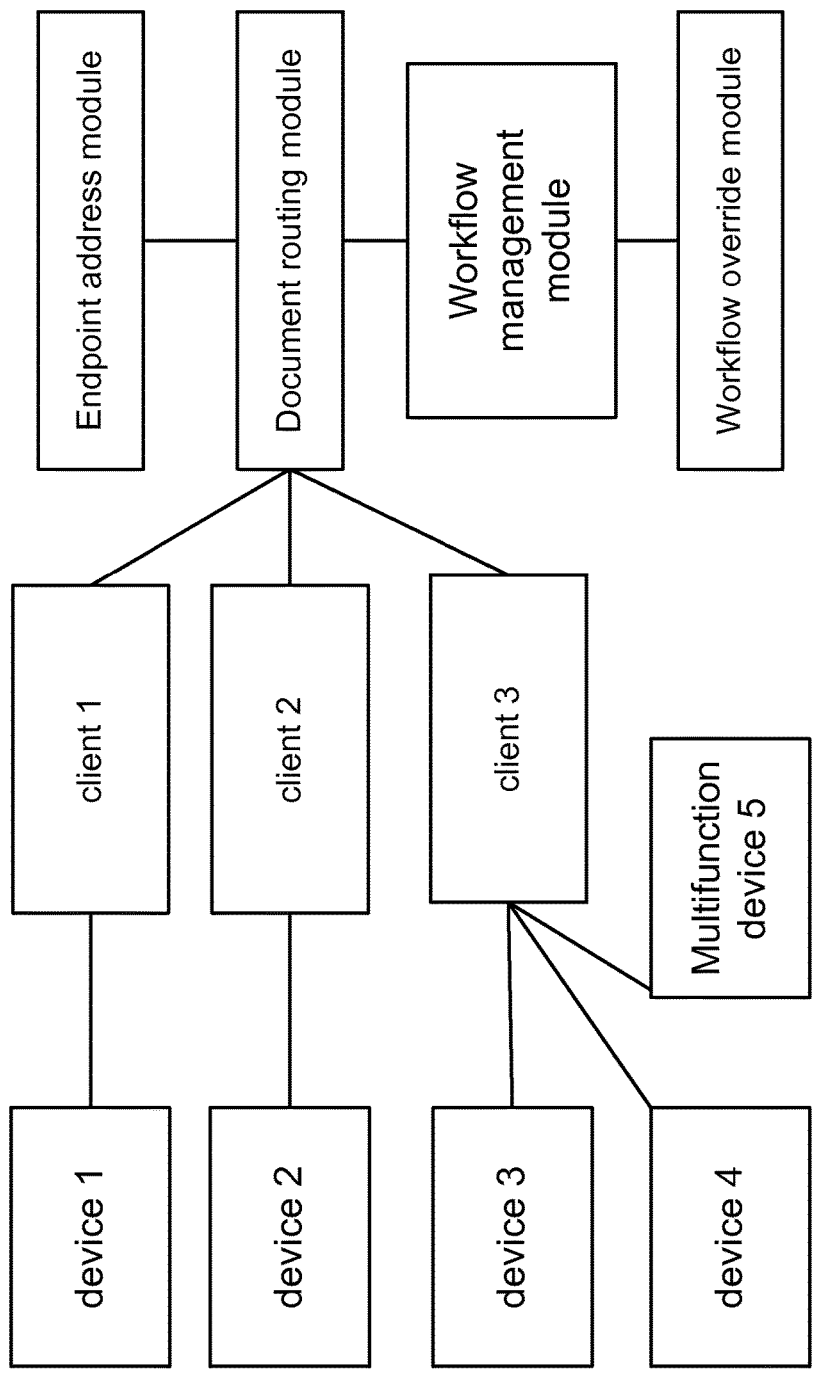
FIG. 8 shows an embodiment of the invention for workflow management module, including a workflow override module, to change the workflow by the user or administrator.
Figure 9:
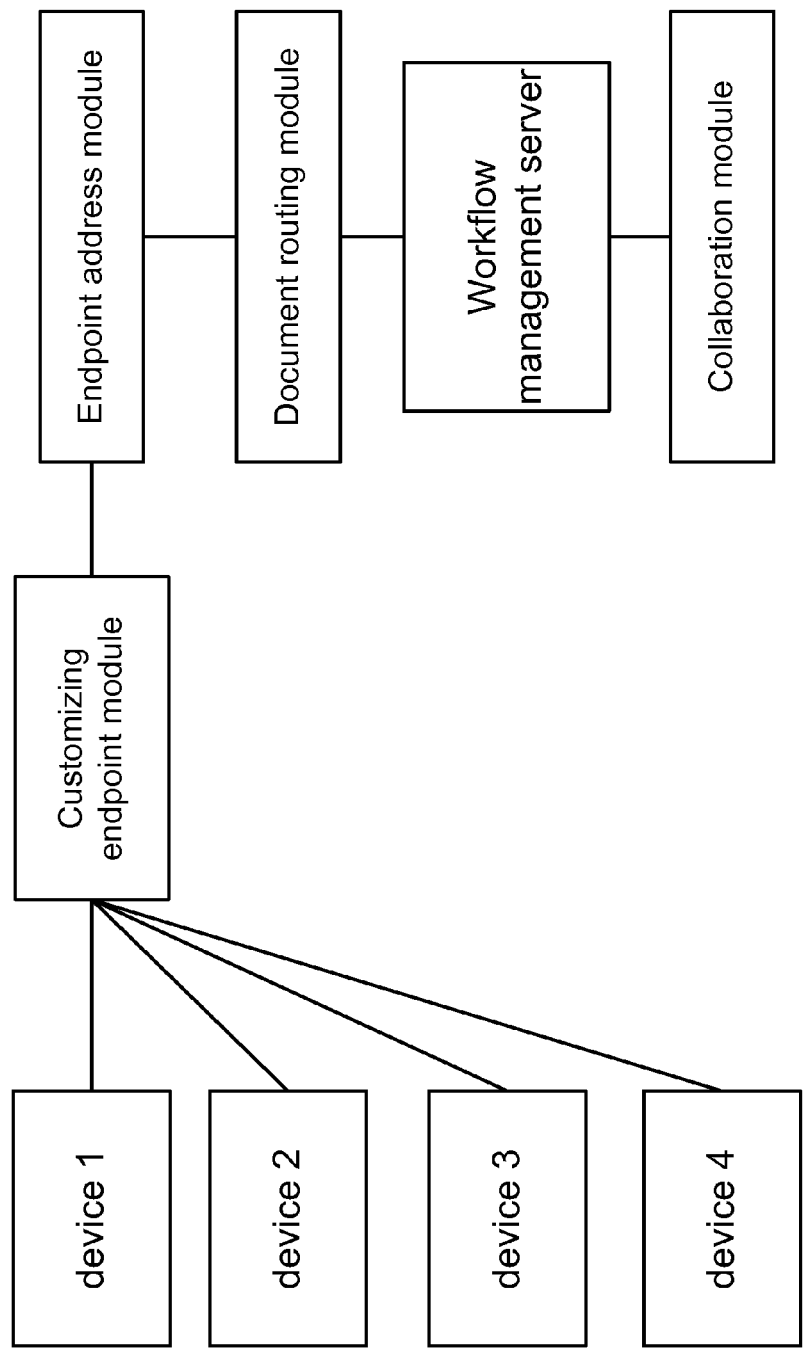
FIG. 9 shows an embodiment of the invention for customizing endpoint module.

FIG. 8 shows an embodiment of the invention for workflow management module, including a workflow override module, to change the workflow by the user or administrator. The system is connected to various clients with various devices and models, with different functionalities and requirements. FIG. 9 shows an embodiment of the invention for customizing endpoint module for different devices, for generating endpoint addresses for workflow management server or system.

Figure 10:
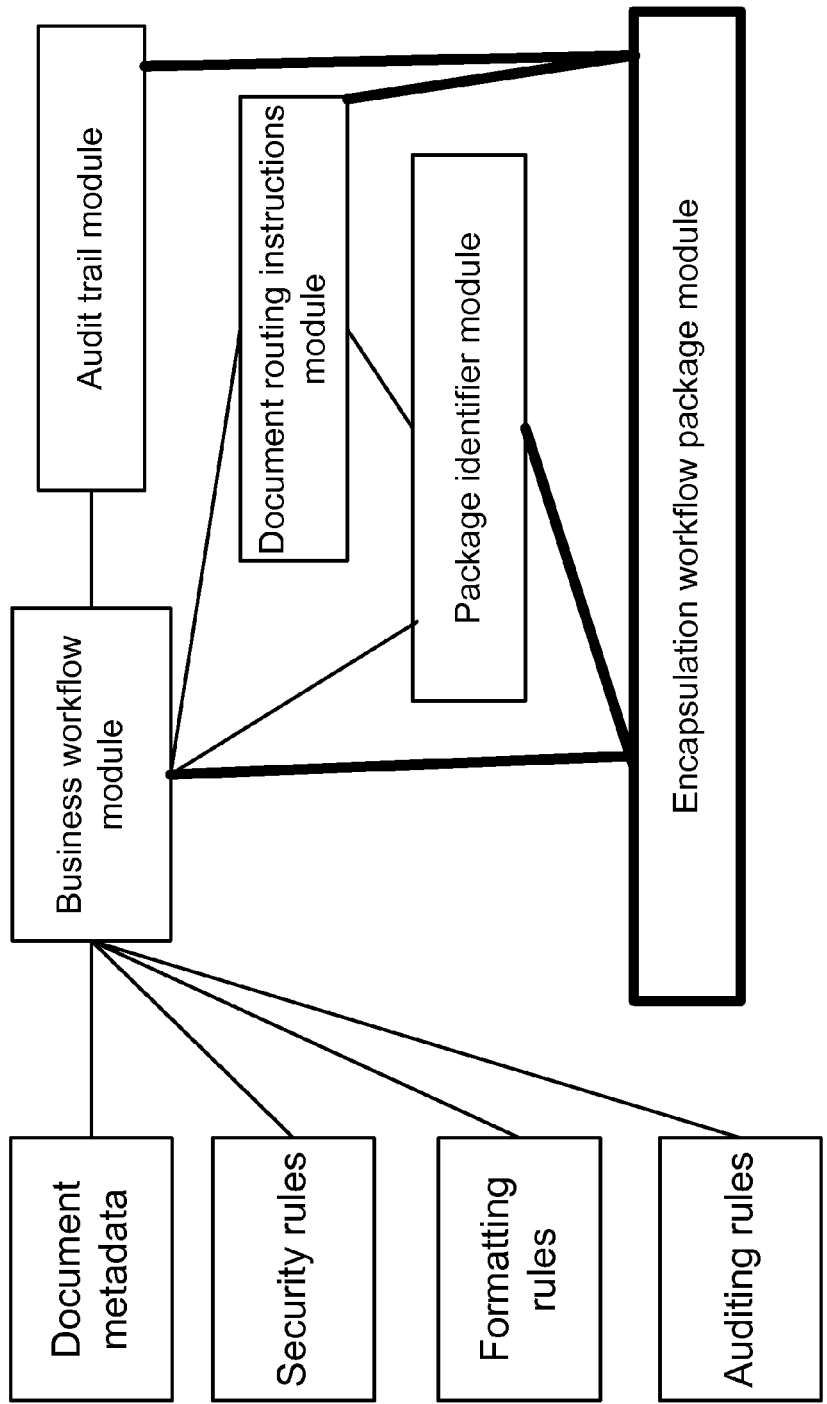
FIG. 10 shows an embodiment of the invention for encapsulation workflow package module.
Figure 11:
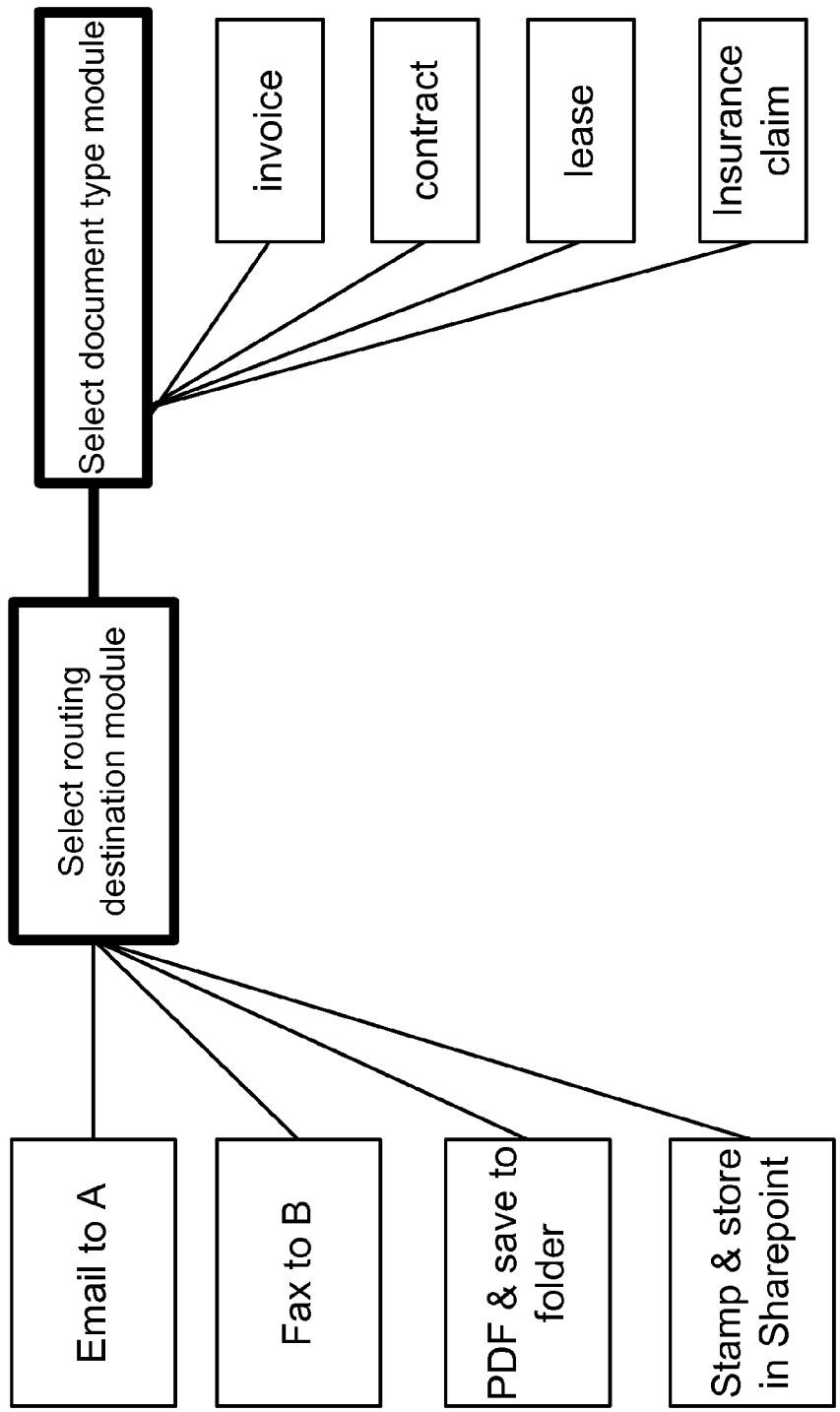
FIG. 11 shows an embodiment of the invention for selecting routing destination and selecting document type.

FIG. 10 shows an embodiment of the invention for encapsulation workflow package module, based on business workflow, audit trail, package identifier, and document routing instructions. The business workflow is based on document metadata, security rules, formatting rules, and auditing rules. FIG. 11 shows an embodiment of the invention for selecting routing destination and selecting document type. Examples related to selecting routing destination are fax, email, generating PDF files, and stamp-and-store in Sharepoint. Examples related to selecting document types are invoice, contract, lease, and insurance claim.

Figure 12:
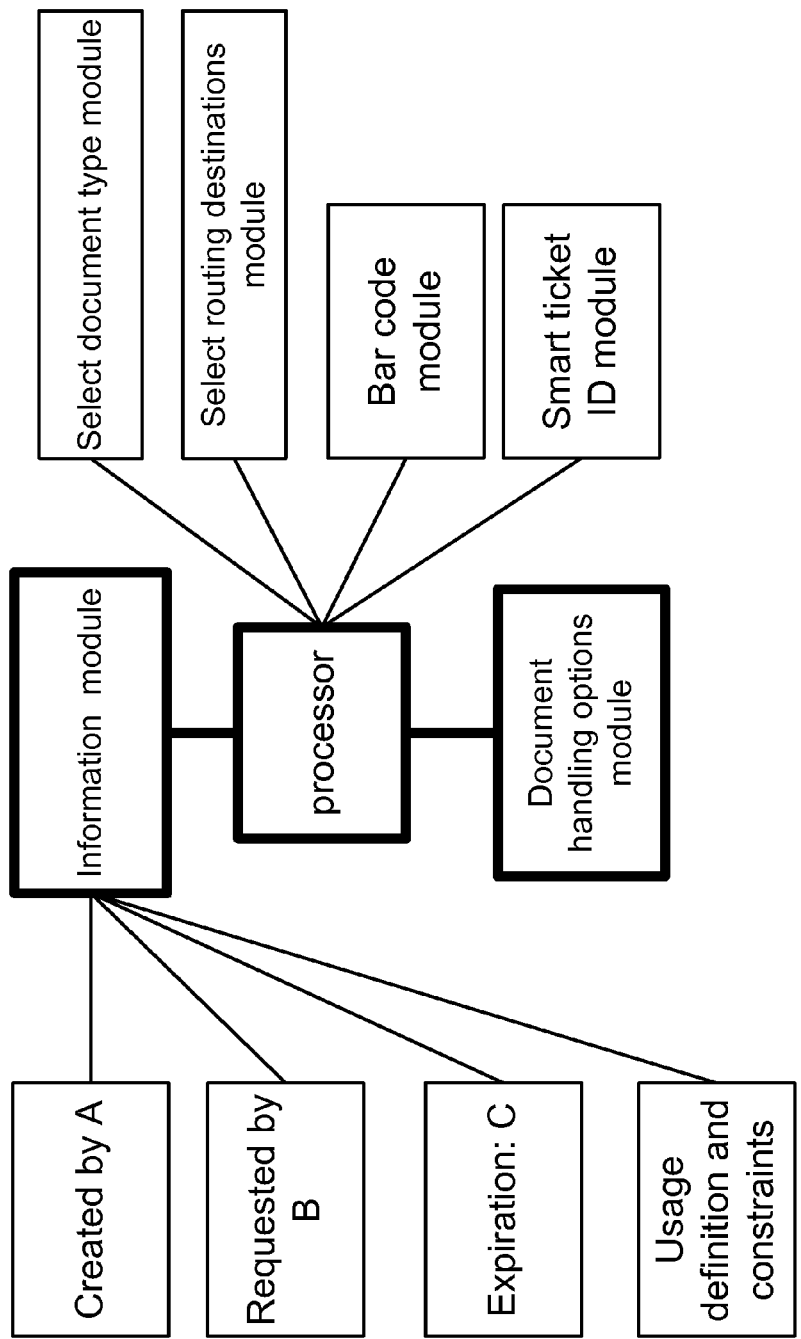
FIG. 12 shows an embodiment of the invention for document handling options module.
Figure 13:
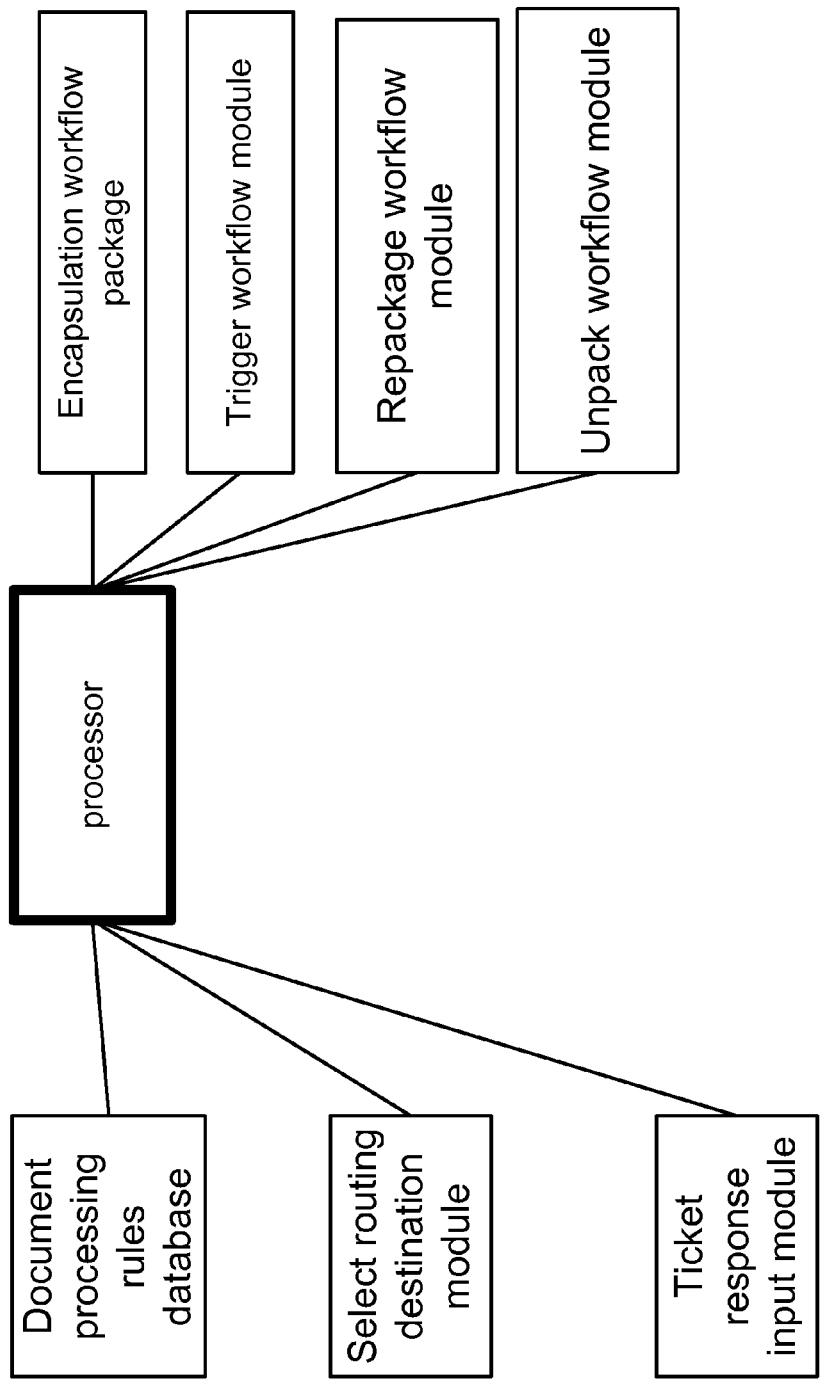
FIG. 13 shows an embodiment of the invention for the document processing module.

FIG. 12 shows an embodiment of the invention for document handling options module, with information related to (for example) who created it, who requested it, when it is expired, and its usage definitions and constraints. The system uses bar codes and smart ticket IDs. FIG. 13 shows an embodiment of the invention for the document processing module, related to FIG. 4, for triggering workflow decisions and processing third party response.

Figure 14:
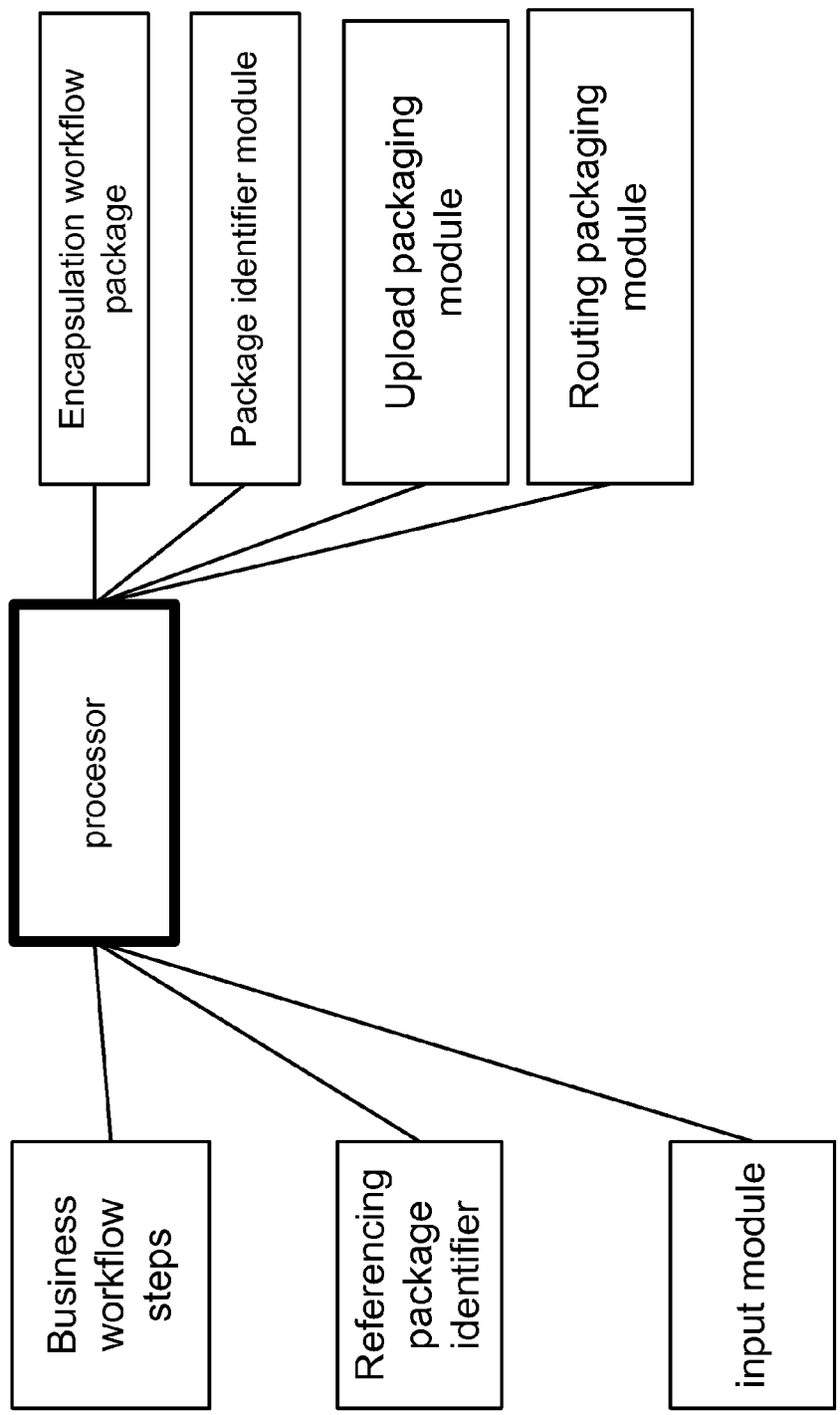
FIG. 14 shows an embodiment of the invention for the document processing module.
Figure 15:
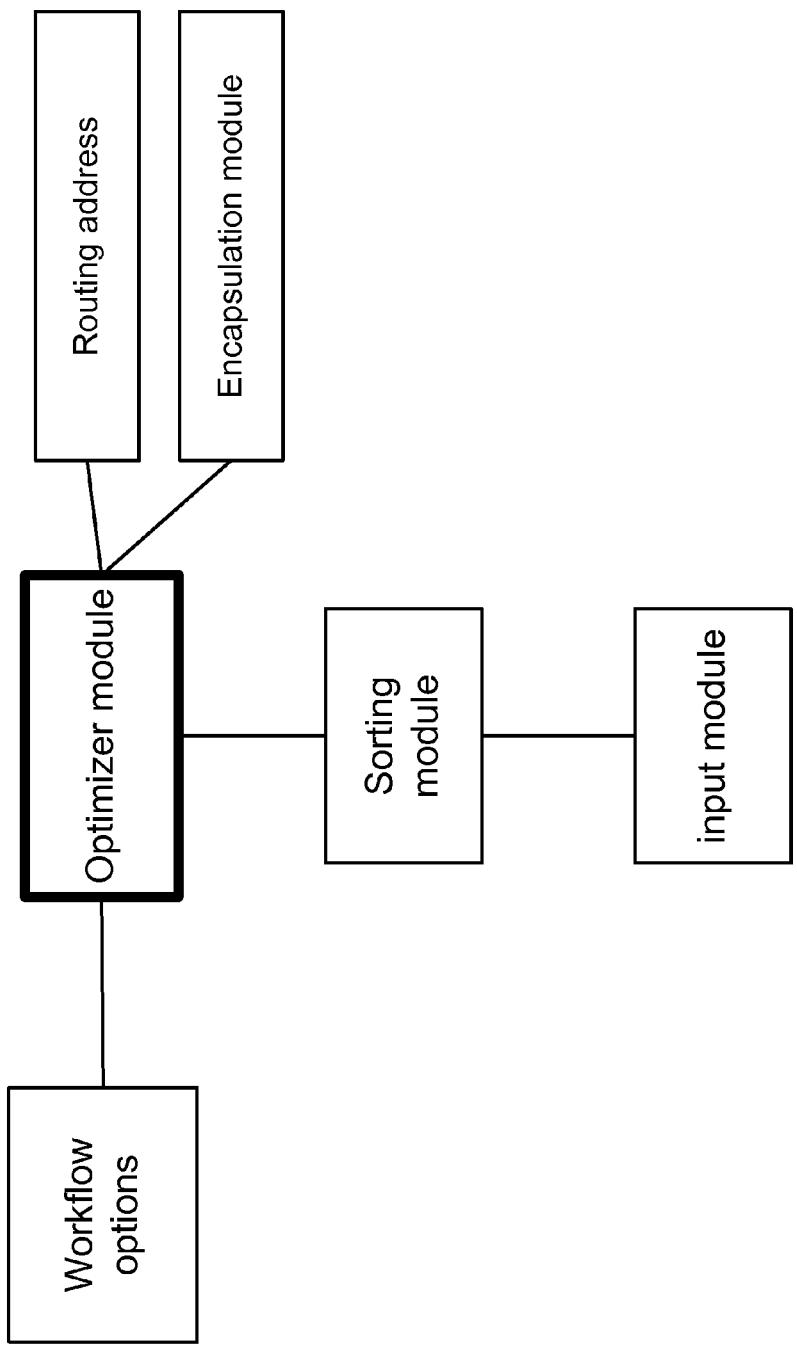
FIG. 15 shows an embodiment of the invention for the optimizer module.

FIG. 14 shows an embodiment of the invention for the document processing module, related to FIG. 5, for processing documents referencing package identifiers. FIG. 15 shows an embodiment of the invention for the optimizer module, where documents are input and sorted, first. Then, the optimization is done based on the available workflow options.

Figure 16:
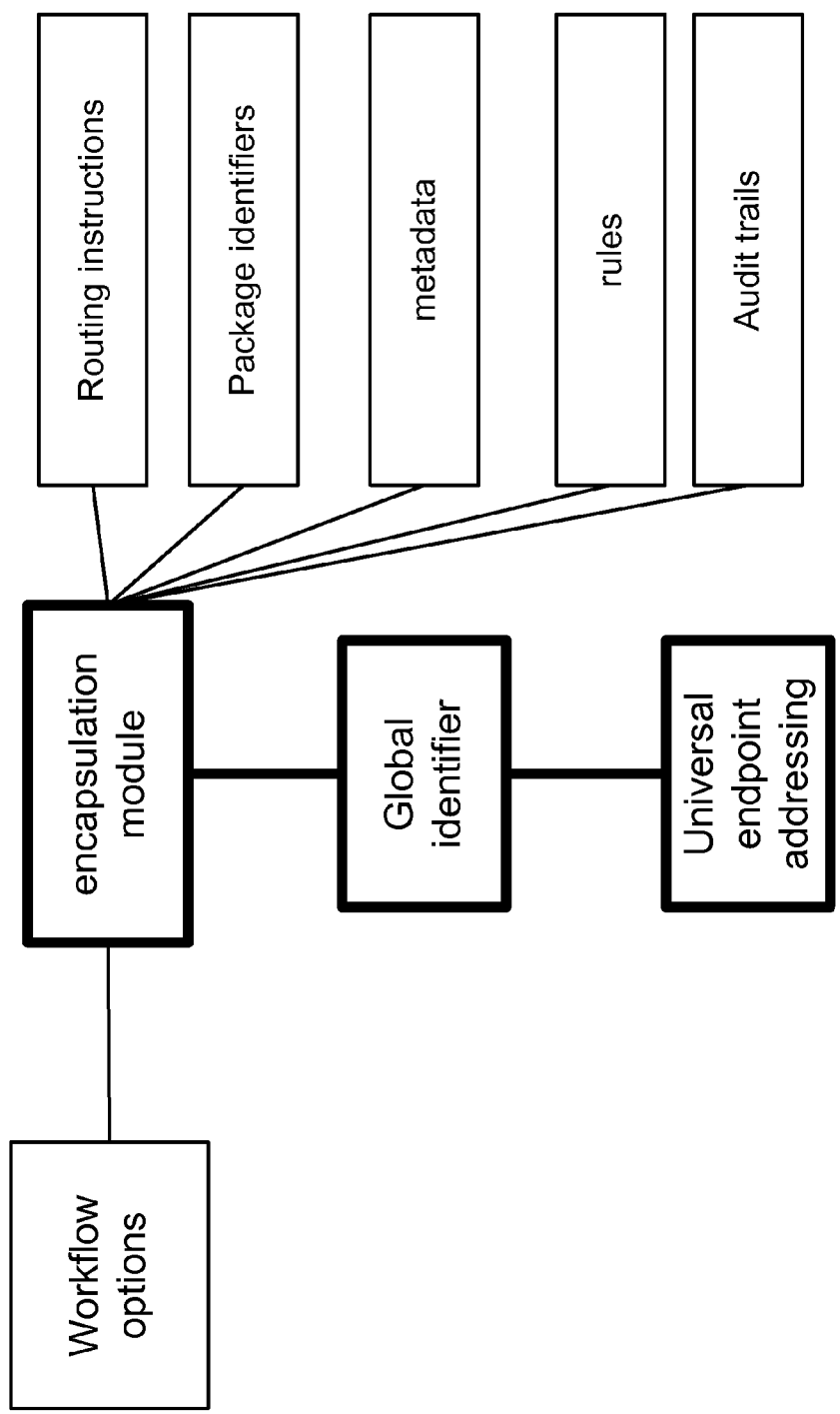
FIG. 16 shows an embodiment of the invention for the global identifier.
Figure 17:
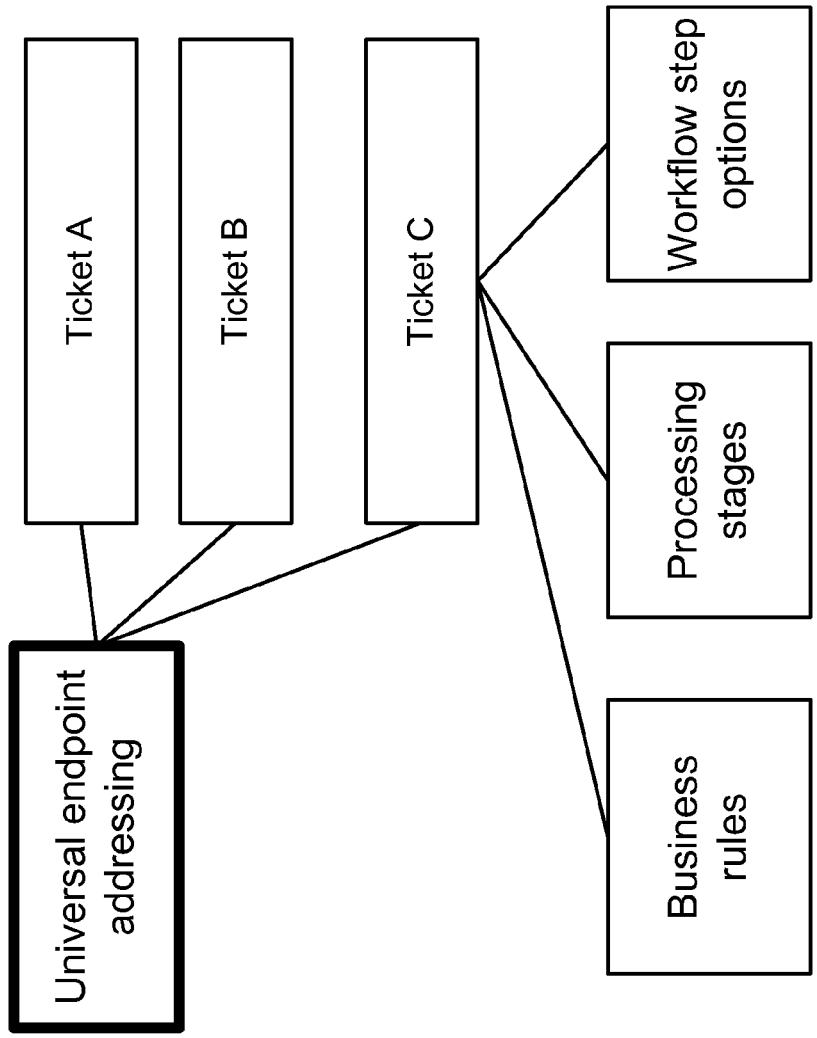
FIG. 17 shows an embodiment of the invention for the Universal Endpoint Addressing.
Figure 18:
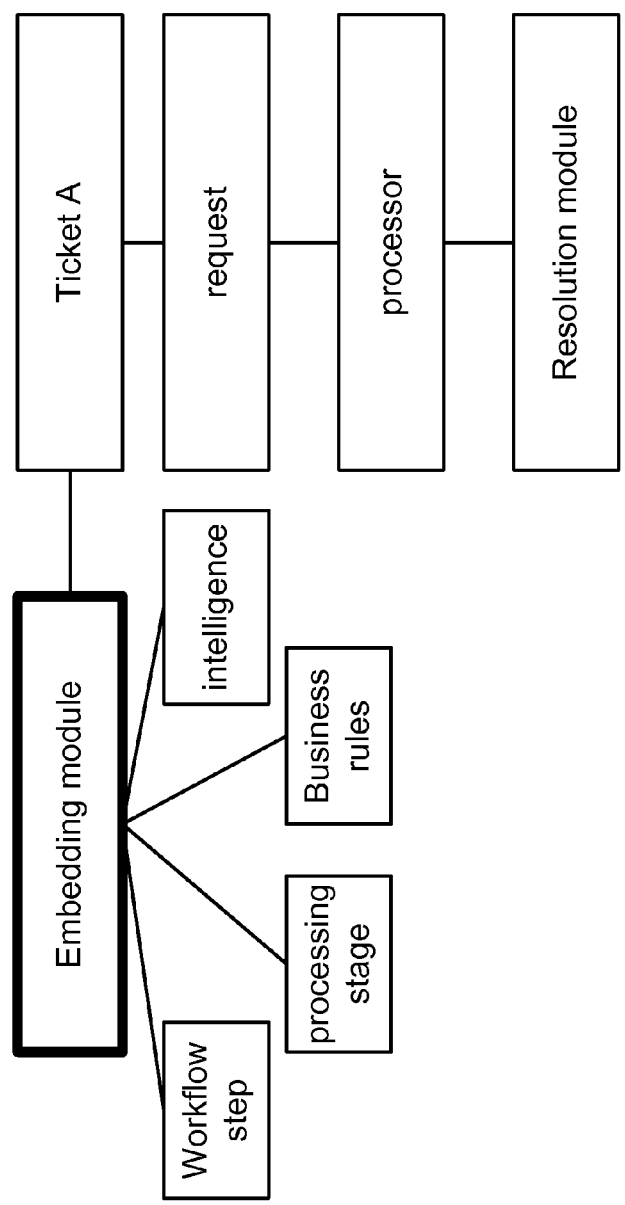
FIG. 18 shows an embodiment of the invention for the resolution module.

FIG. 16 shows an embodiment of the invention for the global identifier, for universal endpoint addressing, with the encapsulation based on routing instructions, package identifiers, metadata, rules, and audit trails. FIG. 17 shows an embodiment of the invention for the Universal Endpoint Addressing, based on tickets, which are based on business rules, processing stages, and workflow steps. FIG. 18 shows an embodiment of the invention for the resolution module, to resolve requests related to tickets, with embedded workflow step, processing stage, business rules, or intelligence information.

Implementations of the invention may be made in hardware, firmware, software, or any suitable combination thereof. The invention may also be implemented as instructions stored on a machine-readable medium that can be read and executed on one or more processing devices. For example, the machine-readable medium may include various mechanisms that can store and transmit information that can be read on the processing devices or other machines (e.g., read only memory, random access memory, magnetic disk storage media, optical storage media, flash memory devices, or any other storage or non-transitory media that can suitably store and transmit machine-readable information). Furthermore, although firmware, software, routines, or instructions may be described in the above disclosure with respect to certain exemplary aspects and implementations performing certain actions or operations, it will be apparent that such descriptions are merely for the sake of convenience and that such actions or operations in fact result from processing devices, computing devices, processors, controllers, or other hardware executing the firmware, software, routines, or instructions. Moreover, to the extent that the above disclosure describes executing or performing certain operations or actions in a particular order or sequence, such descriptions are exemplary only and such operations or actions may be performed or executed in any suitable order or sequence.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A computer-implemented method for providing a universal endpoint address schema to route documents and manage document workflows, said method comprising:

by a hardware processor:

responsive to a user request, creating a global electronic ticket having a globally unique identifier, the global electronic ticket indicating at least one document, at least one destination and at least one document type;

collecting a plurality of rules from a plurality of databases of rules stored in a memory, the plurality of databases of rules including a first database of rules indexed by destinations and a second database of rules indexed by document types, each respective rule of the plurality of rules loaded from the plurality of databases of rules based on the at least one destination and at least one document type indicated, the plurality of rules including a security rule, a formatting rule, and an audit rule;

generating a document workflow, identifiable by the globally unique identifier, by generating a plurality of document operations, each of the document operations associated with the plurality of rules collected, the plurality of document operations generated by determining at least one security operation to add to the document workflow by applying metadata of the at least one document to the security rule;

encapsulating a workflow package including the document workflow, the globally unique identifier, the at least one destination, and an audit trail;

uploading the workflow package, identified by the globally unique identifier, to a networked computer;

receiving, from the networked computer, data related to the workflow package;

automatically performing the plurality of document operations of the workflow package on the at least one document received in the data from the networked computer associated with the global electronic ticket;

storing, in the audit trail, the plurality of document operations; and routing the at least one document to the at least one destination of the request according to the workflow package.

2. The method of claim 1, wherein:

the at least one destination includes one or more client machines; and routing the at least one document includes routing the at least one document to the one or more client machines.

3. The method of claim 1, said method comprising:

validating information based on said document's workflow.

4. The method claim 1, said method comprising:

selecting document types.

5. The method claim 1, said method comprising:

identifying the globally unique identifier by reading a smart ticket identification number.

6. The method claim 1, said method comprising:

identifying the globally unique identifier by reading a bar code.

7. The method of claim 1, said method comprising:

triggering said document's workflow.

8. The method of claim 1, said method comprising:

at least one of: unpacking said document's workflow and repacking said document's workflow.

9. A computer system for providing a universal endpoint address schema to route documents and manage document workflows, said system comprising:

a processor configured to:

responsive to a user request, create a global electronic ticket having a globally unique identifier, the global electronic ticket indicating at least one document, at least one destination and at least one document type;

collect a plurality of rules from a plurality of databases of rules, the plurality of databases of rules including a first database of rules indexed by destinations and a second database of rules indexed by document types, each respective rule of the plurality of rules loaded from the plurality of databases of rules based on the at least one destination and at least one document type indicated, the plurality of rules including a security rule, a formatting rule, and an audit rule;

generate a document workflow, identifiable by the globally unique identifier, by generating a plurality of document operations, each of the document operations associated with the plurality of rules collected, the plurality of document operations generated by determining at least one security operation to add to the document workflow by applying metadata of the at least one document to the security rule;

encapsulate a workflow package including the document workflow, the globally unique identifier, the at least one destination, and an audit trail;

upload the workflow package, identified by the globally unique identifier, to a networked computer;

receive, from the networked computer, data related to the workflow package;

automatically perform the plurality of document operations of the workflow package on the at least one document received in the data from the networked computer associated with the global electronic ticket;

store, in the audit trail, the plurality of document operations; and route the at least one document to the at least one destination of the request according to the workflow package.

10. A non-transitory computer readable medium having stored thereon a sequence of instructions which, when loaded and executed by a processor coupled to an apparatus, causes the apparatus to:

responsive to a user request, creating a global electronic ticket having a globally unique identifier, the global electronic ticket indicating at least one destination and at least one document type;

collecting a plurality of rules from a plurality of databases of rules, the plurality of databases of rules including a first database of rules indexed by destinations and a second database of rules indexed by document types, each respective rule of the plurality of rules loaded from the plurality of databases of rules based on the at least one destination and at least one document type indicated, the plurality of rules including a security rule, a formatting rule, and an audit rule;

generating a document workflow, identifiable by the globally unique identifier, by generating a plurality of document operations, each of the document operations associated with the plurality of rules collected, the plurality of document operations generated by determining at least one security operation to add to the document workflow by applying metadata of the at least one document to the security rule;

encapsulating a workflow package including the document workflow, the globally unique identifier, the at least one destination, and an audit trail;

uploading the workflow package, identified by the globally unique identifier, to a networked computer;

receiving, from the networked computer, data related to the workflow package;

automatically performing the plurality of document operations of the workflow package on the at least one document received in the data from the networked computer associated with the global electronic ticket;

store, in the audit trail, the plurality of document operations; and routing the at least one document to the at least one destination of the request according to the workflow package.

11. The computer system of claim 9, wherein the processor is further configured to:
validate information based on said document's workflow.

12. The computer system of claim 9, wherein the processor is further configured to:
select document types.

13. The computer system of claim 9, wherein the processor is further configured to:
identify the globally unique identifier by reading a bar code.

14. A computer-implemented method for providing a universal endpoint address schema to route documents and manage document workflows, said method comprising:

by a hardware processor:

responsive to a user request, encapsulating a workflow package including a global electronic ticket indicating a document and a destination and having a globally unique identifier, an audit trail configured to store given performed document operations, and a generated document workflow that is identified by the globally unique identifier and having a plurality of document operations, each document operation associated with a security rule loaded from a database of rules indexed by destinations, the plurality of document operations generated by determining at least one security operation to add to the document workflow by applying metadata of the document to the security rule;

automatically performing the document operations of the workflow package on the document associated with the global electronic ticket; and routing the document to the destination according to the workflow package.

* * * * *